US005622594A

United States Patent [19]

Lerner et al.

[11] Patent Number: 5,622,594

[45] Date of Patent: Apr. 22, 1997

[54] APPARATUS FOR THE MANUFACTURE OF SHEETS BEARING DISPLAY SAMPLES

[75] Inventors: Stanley Lerner, Glencoe; Steven B. Winter, Highland Park, both of Ill.

[73] Assignee: Color Communications, Inc., Chicago, Ill.

[21] Appl. No.: 324,381

[22] Filed: Oct. 17, 1994

Related U.S. Application Data

[63] Continuation of Ser. No. 217,088, Mar. 25, 1994, Pat. No. 5,370,024, which is a continuation of Ser. No. 899,264, Jun. 16, 1992, abandoned.

[51] Int. Cl.$^{6}$ .............................. B26D 7/32; B32B 31/00

[52] U.S. Cl. .......................... 156/521; 156/561; 156/562; 83/154; 83/333; 83/346

[58] Field of Search ............................. 83/102, 105, 107, 83/113, 117, 118, 151, 154, 333, 346; 493/373; 271/18.3; 156/265, 521, 561, 562

[56] References Cited

U.S. PATENT DOCUMENTS

| | | | |
|---|---|---|---|
| 1,126,003 | 1/1915 | Graul . | |
| 2,183,797 | 12/1939 | Smith | 216/14 |
| 2,254,394 | 9/1941 | Ratley et al. . | |
| 2,318,173 | 5/1943 | Luehrs | 83/154 |
| 2,318,953 | 5/1943 | Meyers | 83/154 |
| 2,501,835 | 3/1950 | Barber | 83/154 |
| 2,659,437 | 11/1953 | Huck | 83/154 |
| 3,008,364 | 11/1961 | Stobb | 83/154 |
| 3,017,795 | 11/1962 | Joa | 83/333 |
| 3,270,602 | 9/1966 | Kirby et al. | 83/154 |
| 3,431,956 | 3/1969 | Hayes | 83/113 |
| 4,061,521 | 12/1977 | Lerner et al. | 156/265 |
| 4,295,842 | 10/1981 | Bell | 493/373 |
| 4,451,522 | 5/1984 | deVroom | 428/201 |
| 4,497,851 | 2/1985 | deVroom | 427/147 |
| 4,684,120 | 8/1987 | Kamal | 271/18.3 |
| 4,905,599 | 3/1990 | Richey | 83/151 |
| 4,985,012 | 1/1991 | Marschke | 493/373 |

FOREIGN PATENT DOCUMENTS

| | | | |
|---|---|---|---|
| 790370 | 11/1935 | France . | |
| 155403 | 10/1903 | Germany . | |
| 969370 | 5/1958 | Germany . | |
| 1951851 | 6/1978 | Germany | 271/18.3 |
| 104782 | 12/1984 | Germany . | |
| 3826352 | 2/1990 | Germany | 271/18.3 |
| 10431343 | 8/1917 | United Kingdom . | |
| 862951 | 3/1961 | United Kingdom | 83/117 |
| 02389 | 6/1985 | WIPO | 271/18.3 |

OTHER PUBLICATIONS

Catalogue –"Sample Making Equipment" Polytex Switzerland (see p. 6).

*Primary Examiner*—Eugenia Jones
*Attorney, Agent, or Firm*—Fitch, Even, Tabin & Flannery

[57] ABSTRACT

Apparatus for producing sample parts arranged in an array on a base sheet. The apparatus includes a roller about which webbing of the sample material is drawn, the webbing being severed to form the sample parts and to transport the sample parts to a transfer station. Needle take-down apparatus at the transfer station engages the sample part with a plurality of retractable needles to moving the sample parts to a base sheet.

4 Claims, 18 Drawing Sheets

Fig. 4.
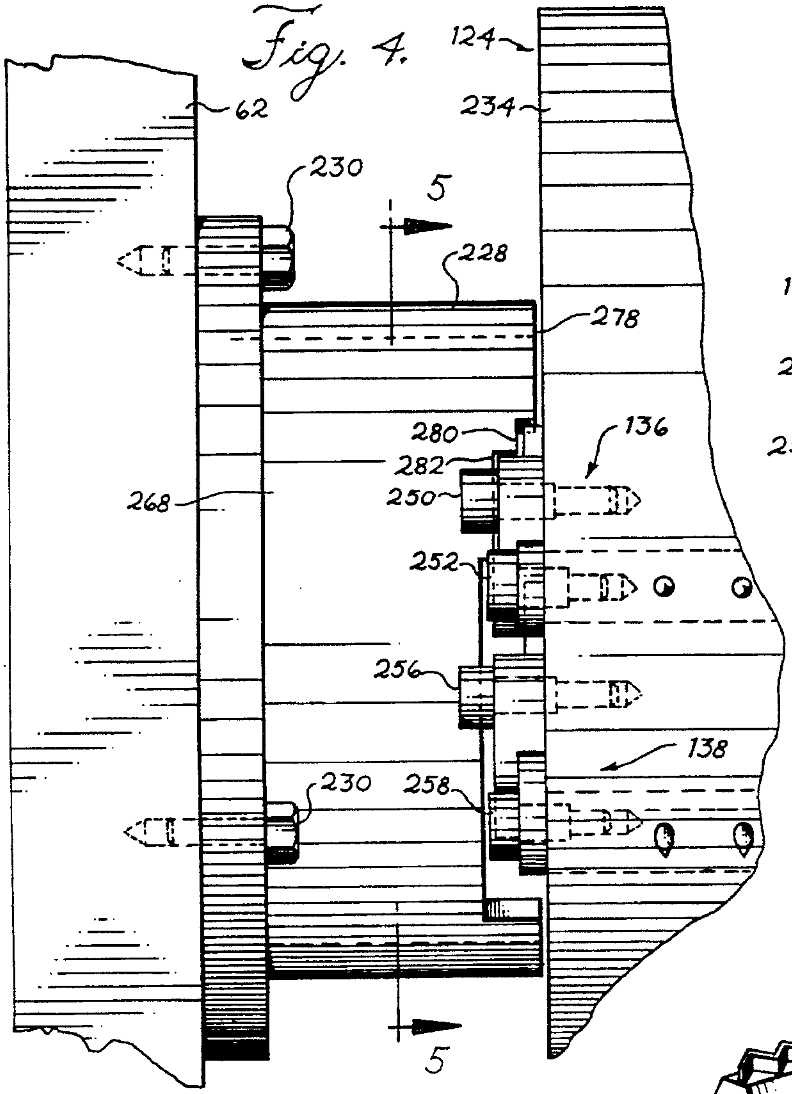
Fig. 6.
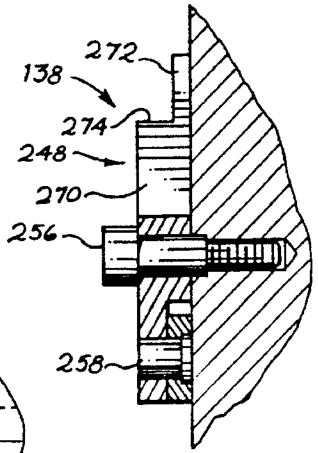
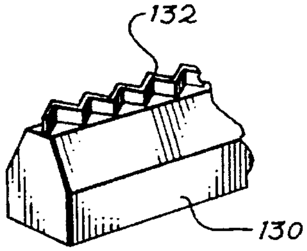
Fig. 8.
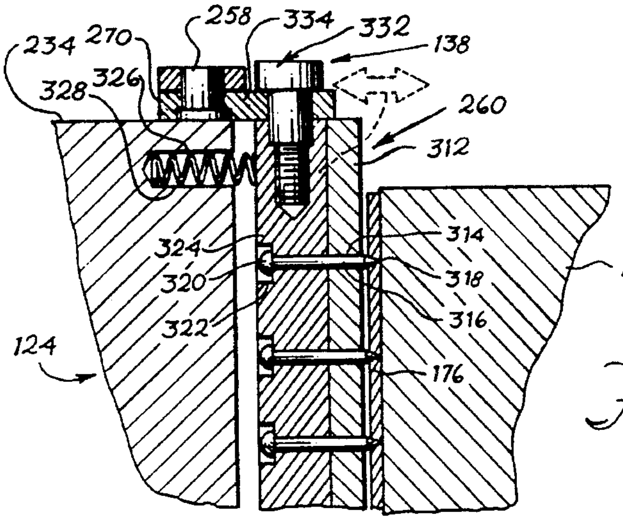
Fig. 7.

34
86
84
82
116
110
96
104
108
106
78
80
76
124
194
90
100
120
98
102
158
156
160
128
192
10
152
130
126
136
160
138
140
150
176
158
72
10
62
142
64
146
182
180
178
70
184
16
22
24
201

Fig. 11
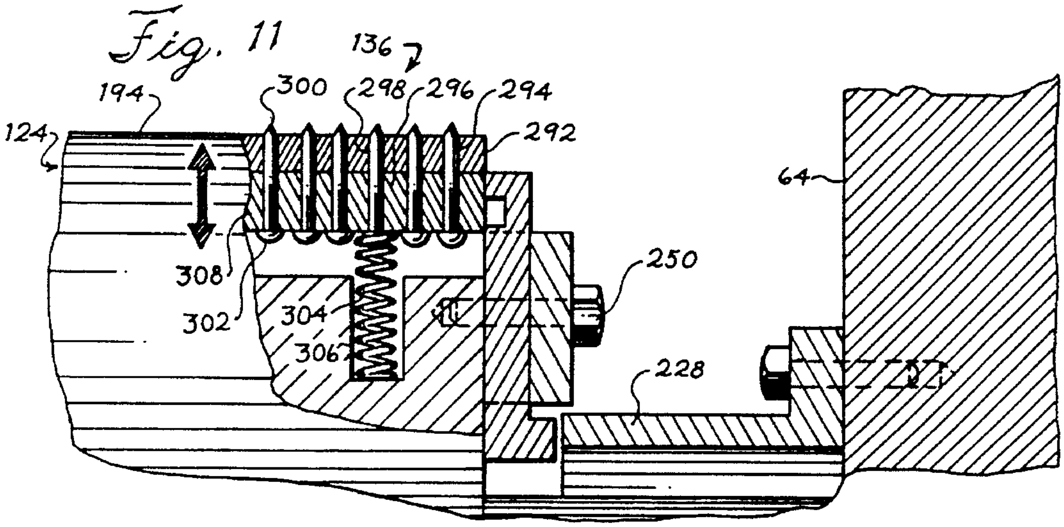
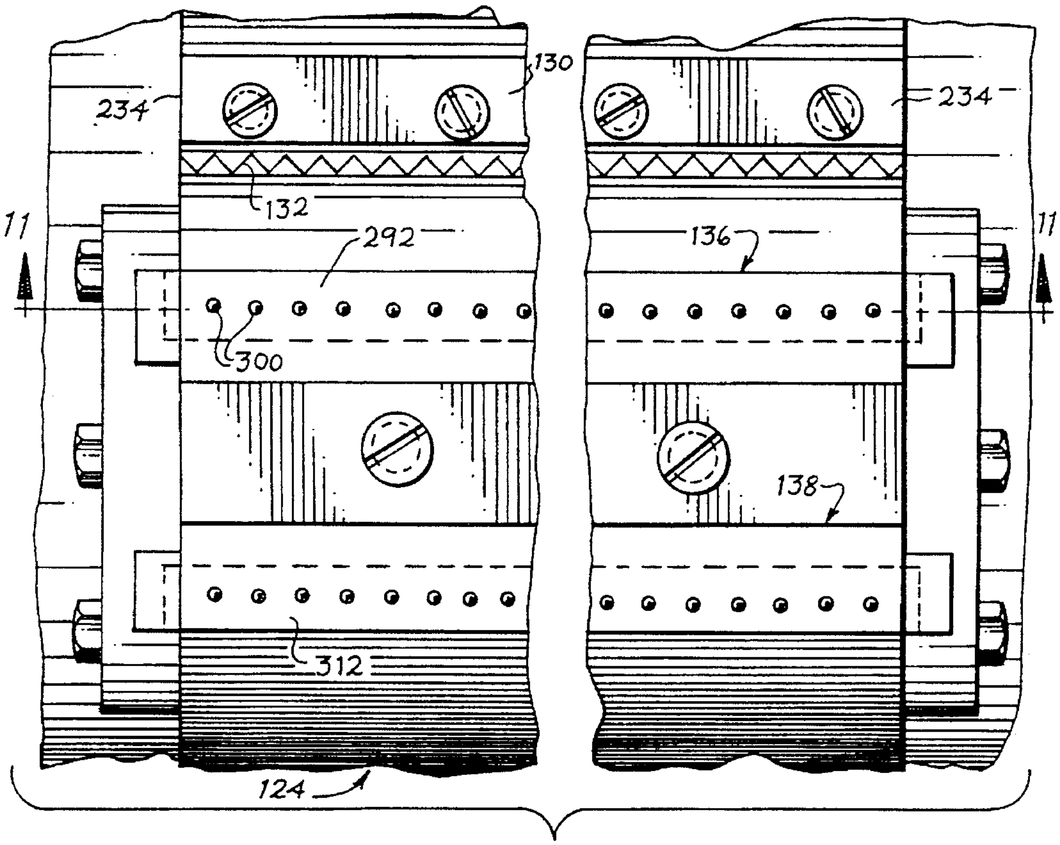
Fig. 10.

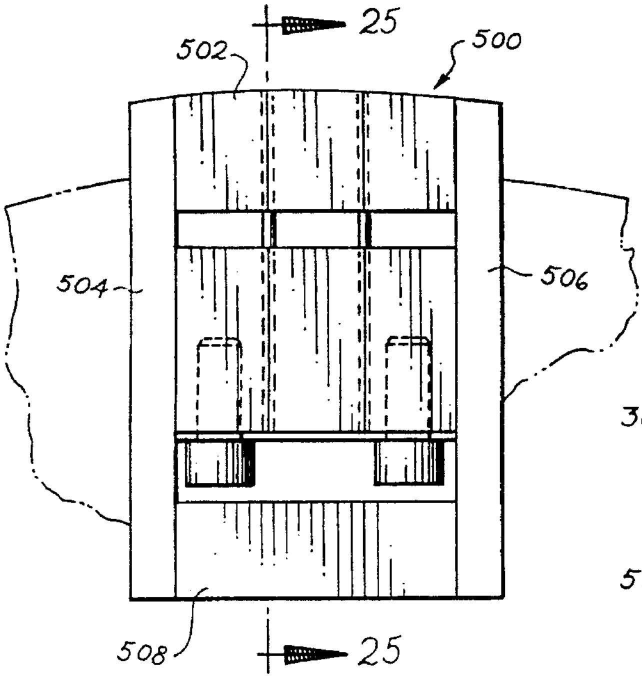
Fig. 24.
Fig. 26.
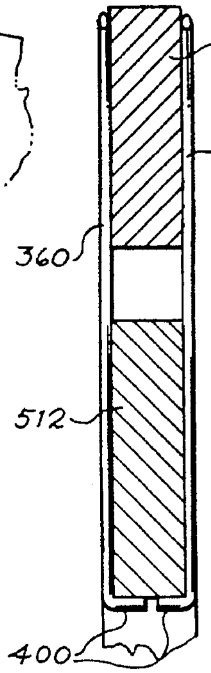
Fig. 27.
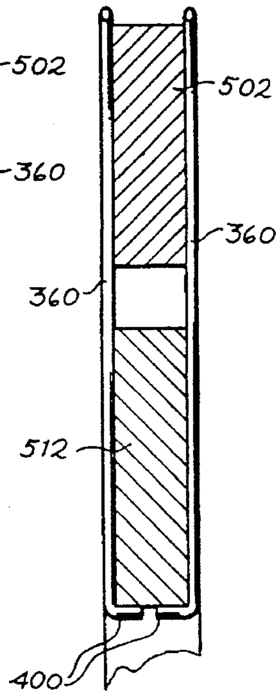
Fig. 25.
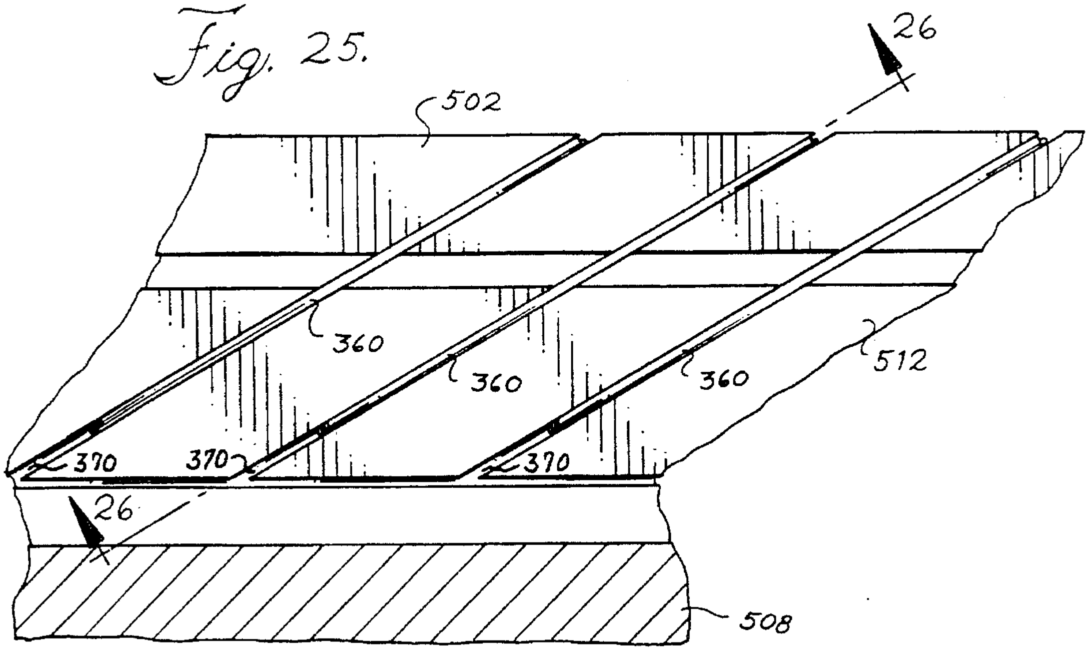

APPARATUS FOR THE MANUFACTURE OF SHEETS BEARING DISPLAY SAMPLES

This is a continuation of application Ser. No. 08/217,088, filed Mar. 25, 1994, now U.S. Pat. No. 5,370,024, which was a continuation of Ser. No. 07/899,264, filed Jun. 16, 1992, now abandoned.

BACKGROUND OF THE INVENTION

1. Field of the Invention

The present invention pertains to methods and apparatus for displaying various samples of fabric and the like materials in a display sheet or book-like catalog format. Manufacturers in an increasing variety of different industries offer a large number of products such as paints, inks, coatings and fabric materials each of which vary by color, surface texture, durability or which differ in other respects, with different groupings cutting across entire product lines. For example, manufacturers of decorating products offer an entire range of colors in several product "families" such as flat, semi-gloss or high gloss paint finishes. Frequently, it is difficult for potential customers to select the precise color within a product family, especially since color perception differs with different lighting conditions and surrounding environments. Accordingly, it is important that a user be able to obtain samples of the products of interest for comparison at a remote location removed from the manufacturers' premises. The present invention is concerned with the manufacture of such sample sheets.

Manufacturers of sample products are frequently called upon to produce a wide variety of products to sample size or to emulate the products in specially fabricated samples which are mounted to a suitable display medium such as a sheet of relatively stiff card stock. Commonly assigned U.S. Pat. No. 4,061,521, has been practiced successfully in the production of swatch bearing sheets, with the swatches arranged in an array on a backing card for ready visual selection.

Frequently, the same machine, even within the course of a business day, may be required to construct display sheets of sample materials having widely different sizes. The apparatus of U.S. Pat. No. 4,061,521 can be readily adapted for swatches of varying sizes and array configurations. For example, many color charts produced today for the paint industry are manufactured by coating sheets of paper with the desired colors and severing the coated sheets with a cutter apparatus to form narrow strips. The narrow strips are then cut down to the size of a desired swatch. The swatches are then picked and placed on a backing sheet and secured thereto with an adhesive.

Such coated sheets are relatively impervious and the various vacuum transport systems of U.S. Pat. No. 4,061,521 perform high speed operations with a high level of efficiency. However, as will be appreciated by those skilled in the art, there are certain materials which are not coated onto a substrate and which cannot be easily emulated with a similar-appearing display swatch. Such materials for example include fabrics of cloth or plastic or composite materials which typically are cut from a large bolt to form samples typically of the order of several inches in square area. If a fabric material is porous enough, a substantial drop in vacuum or (i.e., negative pressure) may be experienced. It is necessary, in such situations, to secure a backing medium to the samples. For example, fabric samples may be mounted to a sheet of relatively impervious backing material made of plastic, paper or the like. This however has a disadvantage of increasing the cost of the sample sheet being produced and adds another step in the sample manufacturing process. It is desirable to eliminate as many steps in the fabrication process as is possible, without sacrificing the quality of the sample assembly being produced.

SUMMARY OF THE INVENTION

It is an object according to the present invention, to provide a method and apparatus for the manufacture of sample assemblies comprising an array of swatches or the like samples mounted directly on a base sheet.

Another object according to the present invention is to provide a method and apparatus for the transfer of such samples from one work station to another, without using vacuum conveying means.

A further object according to the present invention is to provide an apparatus for releasably engaging fabric samples to transport those samples from one location to another without requiring the fabric to be backed by a relatively impervious material.

These and other objects according to the present invention which will become apparent from studying the appended description and drawings are provided in an apparatus for forming samples from a webbing having upper surface portions to a workstation, comprising:

a first drum and a second drum, with the second drum located adjacent the first drum and the work station;

means for rotatably mounting said first and second drums;

means for introducing a webbing over at least a portion of said first drum and then over at least a portion of said second drum in a feed direction, with the first drum thereby located upstream of the second drum;

webbing engaging means carried on at least one of the first and second drums, movable toward and away from the webbing for selectively engaging and selectively releasing a portion of the webbing;

advancing means for advancing said webbing engaging means towards said webbing;

cutting means upstream of said webbing engaging means for cutting said webbing to separate a sample portion therefrom;

means for indexing said first and second drums to advance said sample to said workstation; and means for retracting said webbing engaging means away from said webbing to release said sample portion thereby completing transfer of said sample portion to said workstation.

BRIEF DESCRIPTION OF THE DRAWINGS

In the drawings, wherein like elements are referenced alike:

FIG. 4 is a fragmentary view of the upper left-hand portion of FIG. 3, shown in greater detail;

FIG. 6 is a fragmentary cross-sectional view taken along the line 6—6 of FIG. 5;

FIG. 7 is a fragmentary cross-sectional view taken along the line 7—7 of FIG. 5;

FIG. 8 is a fragmentary perspective view of the severing head of FIG. 5;

FIG. 10 is a fragmentary view showing a portion of the surface of the drum in FIG. 9, taken along the lines 10—10;

FIG. 11 is a fragmentary cross-sectional view taken along the line 11—11 of FIG. 10;

FIG. 24 is an end view of an alternative needle bar according to principles of the present invention;

FIG. 25 is a fragmentary cross-sectional view taken along the line 25—25 of FIG. 24;

FIG. 26 is a fragmentary view taken along the line 26—26 of FIG. 25;

FIG. 27 is a view similar to that of FIG. 26, but showing the needles in an extended operating position;

DETAILED DESCRIPTION OF THE PREFERRED EMBODIMENTS

Figure 1:
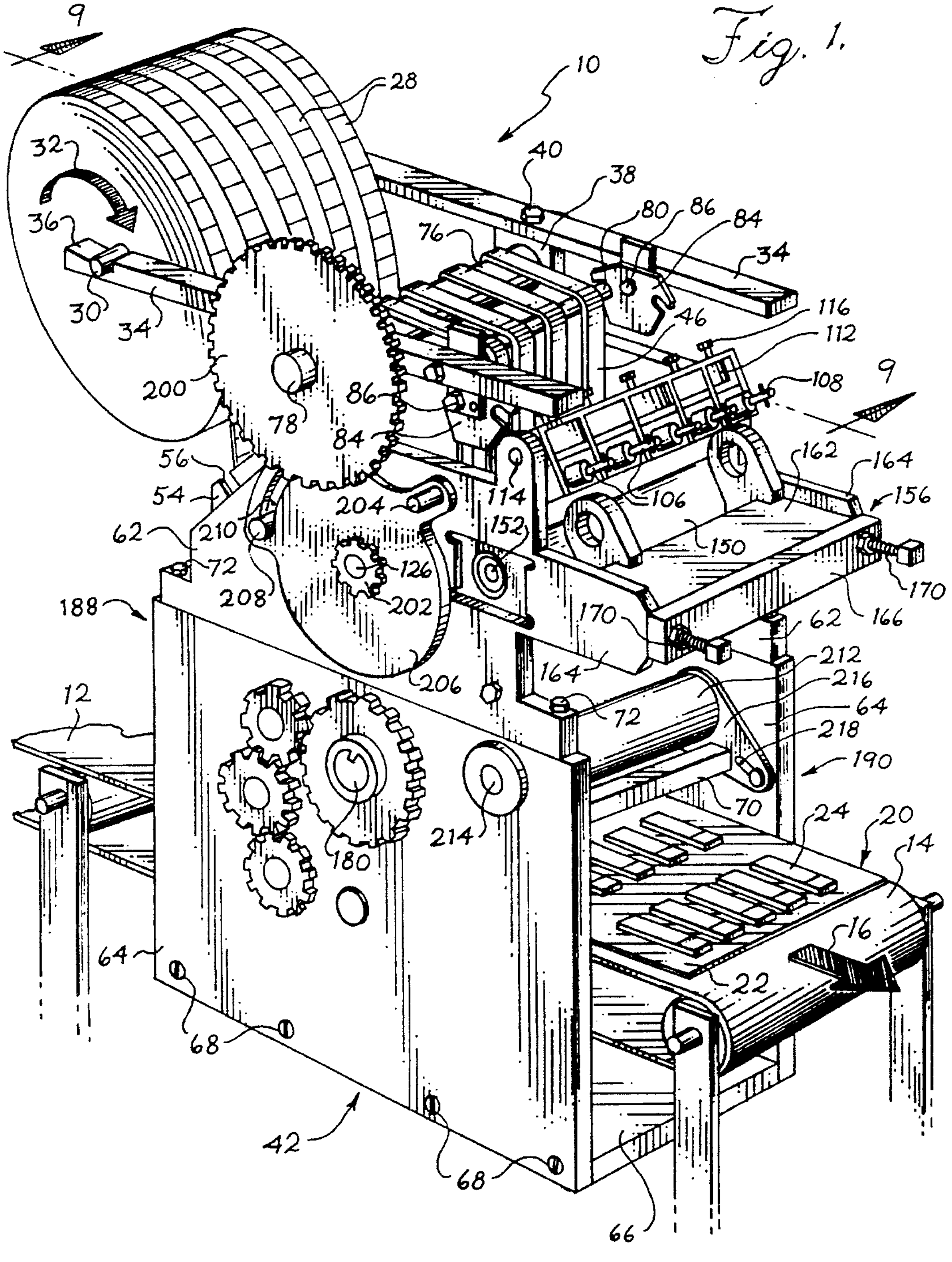
FIG. 1 is a perspective view of apparatus illustrating aspects according to the present invention.

The present invention is directed to several preferred embodiments for producing an array of samples on a card or backing sheet. Apparatus according to the present invention is of the same general type as that of commonly assigned U.S. Pat. No. 4,061,521, the disclosure of which is herein incorporated by reference. That patent represented a significant improvement over the manual assembly of display products such as those commonly referred to in the industry as "color cards". Stacks of samples, sometimes referred to as "paint chips" are stacked in individual till boxes. The samples are lifted by suction cups for transport to a base sheet and are secured thereto with adhesive. The method and apparatus of U.S. Pat. No. 4,061,521 provided a significant improvement by the automated manufacture of display products. At its input stations, the apparatus has a stack of base sheets, webbing comprised of the products to be displayed or emulations thereof provided as rolls of ribbon, and between these two input stations, a supply of adhesive is controlled for dispensing. The apparatus automatically removes a base sheet from the supply stack, placing the base sheet on a moving transfer or conveyor which transports the base sheet to various workstations and which delivers a finished product to an output station for storage or packing for transport to a remote location.

The base sheets which are picked and placed on the conveyor are positioned for alignment with respect to downstream workstations which apply adhesive and swatches in a closely spaced two-dimensional array. Since it is desirable to avoid trimming of the base sheet after the sample production operations are completed, it is important that the various two-dimensional arrays of swatches are accurately positioned on the base sheet. A number of important features are provided in U.S. Pat. No. 4,061,521 to insure the accuracy and repeatability of material placement in a high speed operation in which the base sheet is continuously or at least substantially continuously moving at all times throughout the apparatus, thus contributing to the production rate achieved by the apparatus. At the various application stations, a rolling motion is provided to install a linear side-by-side array of materials, which represent, in the finished product, one row of a two-dimensional array. A plurality of such installation stations are provided, typically one for each row, and thus the two-dimensional array is built-up, row by row.

As mentioned, a base sheet is picked and placed onto a moving conveyor. A vacuum feed wheel performs the pick and place operation. The feed wheel has air passages therethrough which are manifolded for convenient connection to a vacuum source. The vacuum at the face of the feed roller applies a suction pull to the base sheet, and it has been found that higher feed rates can be accomplished by having a plurality of vacuum ports on the feed wheel. However, in order to avoid excessive vacuum losses, the vacuum ports not currently being used are valved off by a rotating valve.

Once loaded on the conveyor, the base sheets are advanced to an adhesive applying station. An application roller carries, on its surface, rows of glue pads which have the same predetermined lateral spacing as that desired in the finished display product. The glue pads are mounted on a plastic carrier sheet wrapped about the surface of the application roller. In addition to the predetermined lateral spacing, the glue pads also have a surface area corresponding to that of the swatch size to be bonded to the base sheet.

As those who are familiar with this art area will appreciate, it is important that apparatus of this type be made capable of rapid reconfiguration to support the production of different display products having differently dimensioned arrays of display samples. In the adhesive application station of U.S. Pat. No. 4,061,521 the plastic carrier sheet disposed about the roller surface can be readily replaced with another carrier sheet having a different array of glue pads located thereon. The base sheets are passed under the adhesive application roller, the glue pads coming in contact with the upper or exposed base sheet surface so as to deposit a "glue" or more correctly an adhesive, whether or not of animal origins, to the base sheet.

The base sheet is then passed to a swatch forming and applying station. In order to maintain parallelism of the sheet as it is being transferred along the conveyor, side edge guides and hold down guides are employed. At the swatch forming and applying station, reels of ribbons comprised of the sample material to be displayed are mounted for a simultaneous pay-out. A number of tensioning means such as tension rollers are provided to prepare the ribbons for severing. The ribbons are brought into contact with a severing drum provided with vacuum ports for imparting a suction pull to the ribbons. A suction feed roller upstream of the severing drum is also evacuated to engage the ribbon and to maintain tension while controlling feed of the ribbon free end.

A plurality of vacuum ports are provided on the face of the severing drum, to engage a substantial portion of the ribbon, holding the ribbon firmly against the severing drum surface. A cutting blade is medially disposed along the ribbon portion temporarily secured to the severing drum. The severing blade has a leading edge which projects above the severing drum surface. A stationary anvil blade is positioned adjacent the severing drum surface. As the severing drum, carrying the free end of the ribbon is rotated, the ribbon is trapped between the moving cutter blade and the stationary anvil blade, thereby severing the ribbon thereat. As mentioned, the leading end of the ribbon is secured to the severing drum surface by a plurality of vacuum ports and thus, the severed ribbon portioned is carried along the severing drum surface as the drum rotates toward a transfer station.

A transfer roller is disposed adjacent the severing drum to receive the severed ribbon free end therefrom. The transfer roller is also evacuated, having a series of vacuum ports on its outer surface. The severed ribbon free ends, comprising the sample swatches to be displayed, are drawn in contact with the drum surface by the vacuum. Rotating valves carried on the severing roller and the transfer roller coordinate the release of the swatch from the severing roller and the adherence of the swatch to the transfer roller. The transfer roller thereafter carries the swatch to a portion of the base sheet having adhesive applied thereto at the upstream application station. The transfer roller presses the swatch against the adhesive, thereby forming a bond between the swatch and the base sheet.

The apparatus of U.S. Pat. No. 4,061,521 performs the above operations at a high rate of speed, with up to 100 base sheets being covered, row by row, with swatches each minute of operation of the apparatus. The timing between the various rollers at the adhesive application and the severing and transfer stations must be carefully controlled if faster production rates are to be achieved, and if display products are to be produced in a reliable manner, without requiring trimming or other post-production adjustments to the products. The timing between the various rollers is achieved with a direct drive between the various rollers, using gear or chain connections to prevent slipping and subsequent mistiming within the overall apparatus. Of course, the valving of the vacuum ports on the various rollers of the severing and transfer station must be coordinated, and such is accomplished with rotating valve means carried on the various rollers. Of course, multiple severing and transfer stations are required, depending on the number of rows required for a display product.

The cumulative vacuum load for the entire operation can be substantial. While above vacuum operated apparatus has proven very successful for relatively impervious sample materials such as paint coated on paper strips, the vacuum demand required for more porous sample materials such as fabrics and the like is increased substantially. For fabrics having a more open weave, a backing of the material is recommended to assist in the vacuum transfer operations. This represents an additional cost directly attributable to the vacuum transfer means within the display producing apparatus. As will now be described, the method and apparatus according to principles of the present invention provides improvements to material transfer operations, particularly improvements in the swatch forming and applying station of U.S. Pat. No. 4,061,521. The apparatus and method of the present invention is employed downstream of the adhesive applying station, and receives an adhesive coated base sheet. As will be seen, the present invention is particularly useful when processing fabric materials.

Referring now to FIG. 1, inventive apparatus for severing and applying display materials to a base sheet is generally indicated at 10. Disposed beneath apparatus 10 is a first conveyor 12 located in the product flow upstream of apparatus 10, and a downstream conveyor 14. The conveyors advance the base sheets and finished products in the downstream direction of arrow 16. There is visible in FIG. 1 a finished display product generally indicated at 20 being carried by the downstream conveyor 14. Display product 20 includes a base sheet 22 and a two-dimensional array of samples 24. Not visible in the display product 20 are adhesive coatings between the samples and base sheet 22. Disposed on upstream conveyor 12, but not shown in the FIG. 1, is a base sheet to which adhesive coatings have been applied in the pattern corresponding to that of the samples 24 of the display product 20.

A series of base sheets coated with adhesive is fed into the apparatus 10. A second input of supply material is provided by a plurality of reels 28 of webbing comprised of the sample material to be displayed in product 20. Illustrated in FIG. 1 are five reels 28 and, as indicated, the reels are spaced-about in a transverse direction. The reels are mounted on a spindle 30 and preferably are freely rotatable in the direction of arrow 32. The reels 28 could be rotatable about spindle 30 and/or the spindle 30 could be rotatable about the longitudinal axis thereof. In the preferred embodiment, spindle 30 is supported by a pair of bar-like side rails 34. Steps 36 are formed in the side rails 34 to hold spindle 30 captive despite tension applied to the webbing carried by the reels 28. The side rails 34 are secured by upright support members 38 extending from a frame structure generally indicated at 42, and are secured thereto by bolt fasteners 40. As will be seen herein, the support structure 42 provides support for the entire apparatus 10 and may be conveniently mounted to a factory floor, for example.

Figure 2:
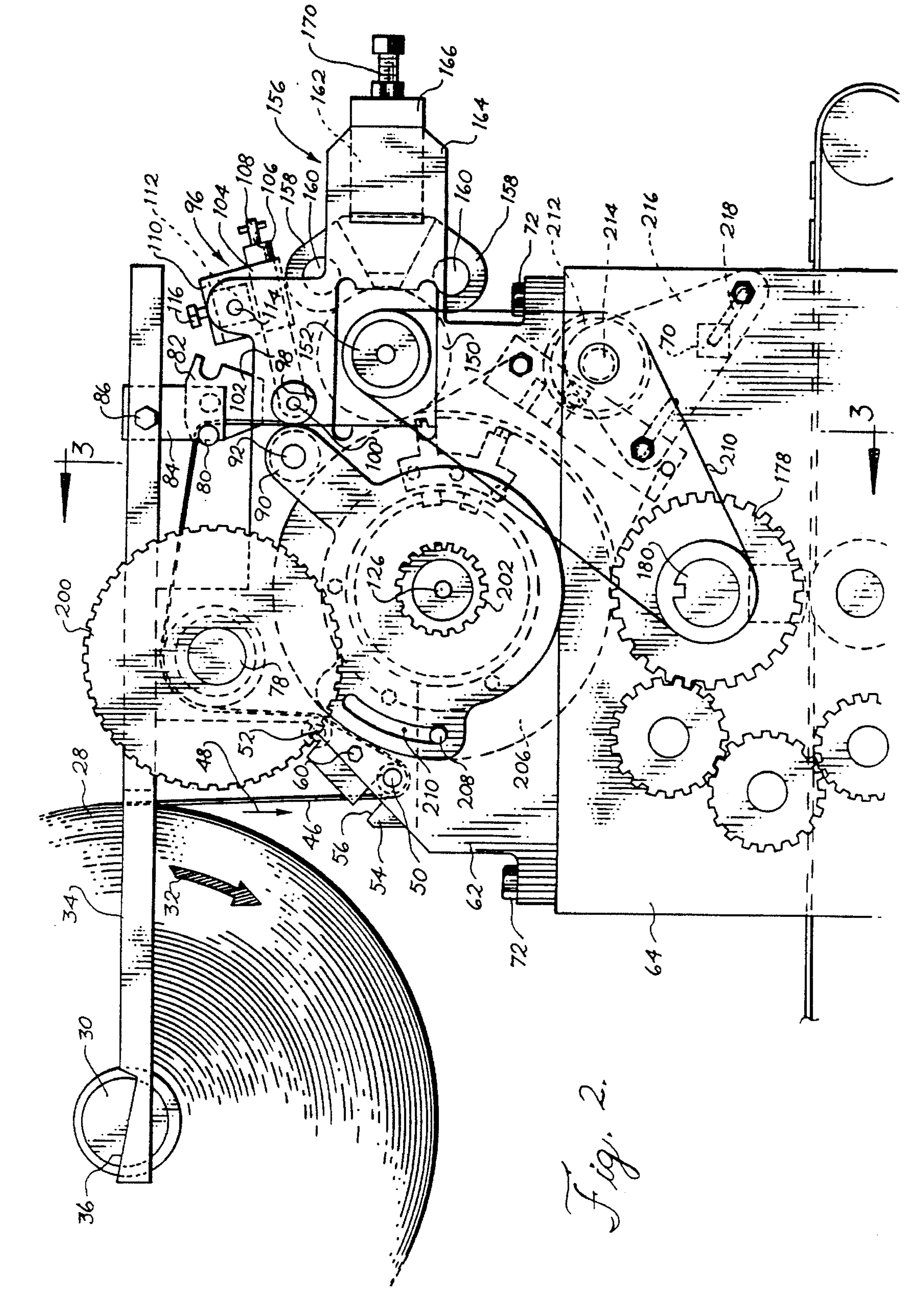
FIG. 2 is a side elevational view of the apparatus of FIG. 1.
Figure 3:
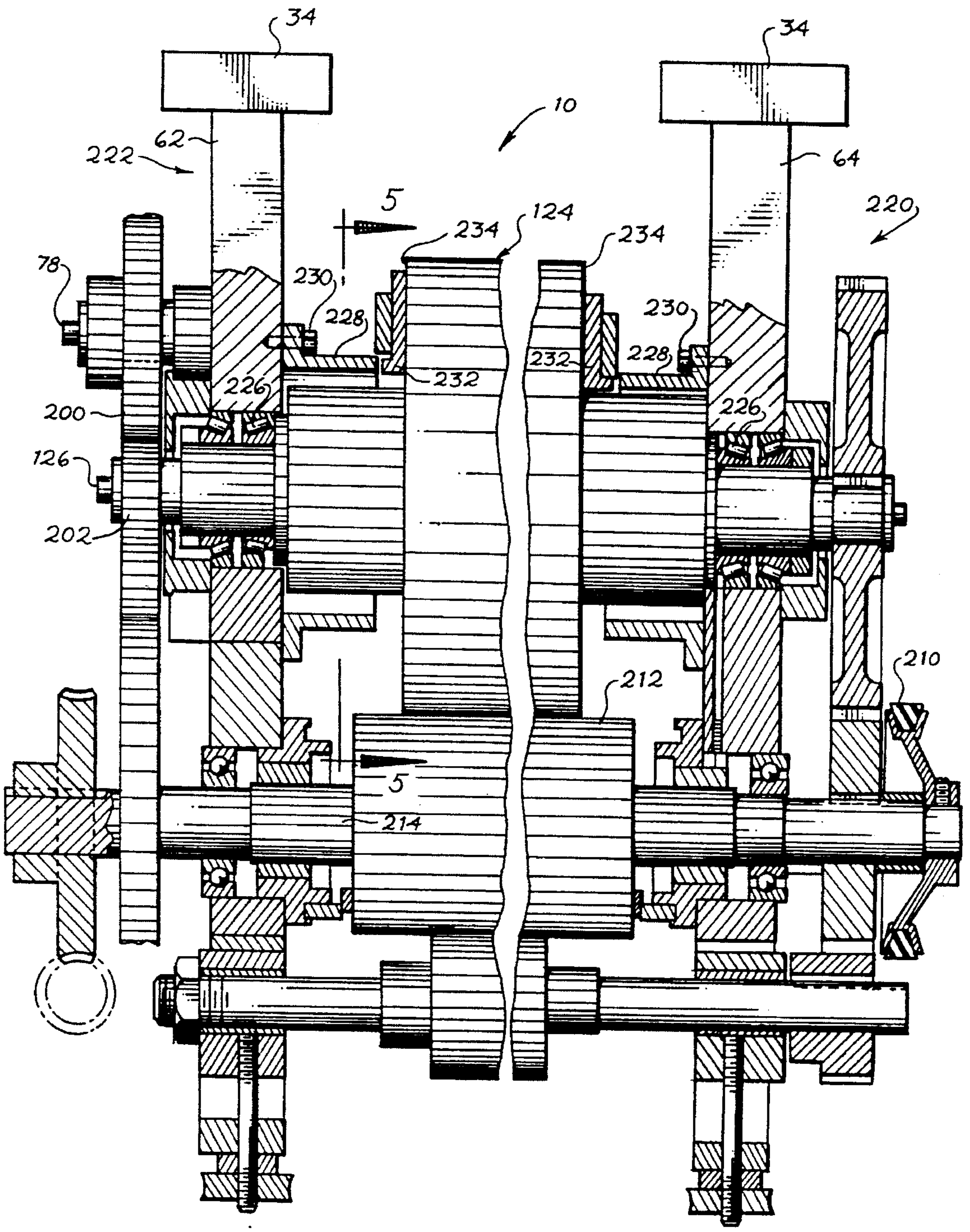
FIG. 3 is a fragmentary cross-sectional view taken along the line 3—3 of FIG. 2.
Figure 9:
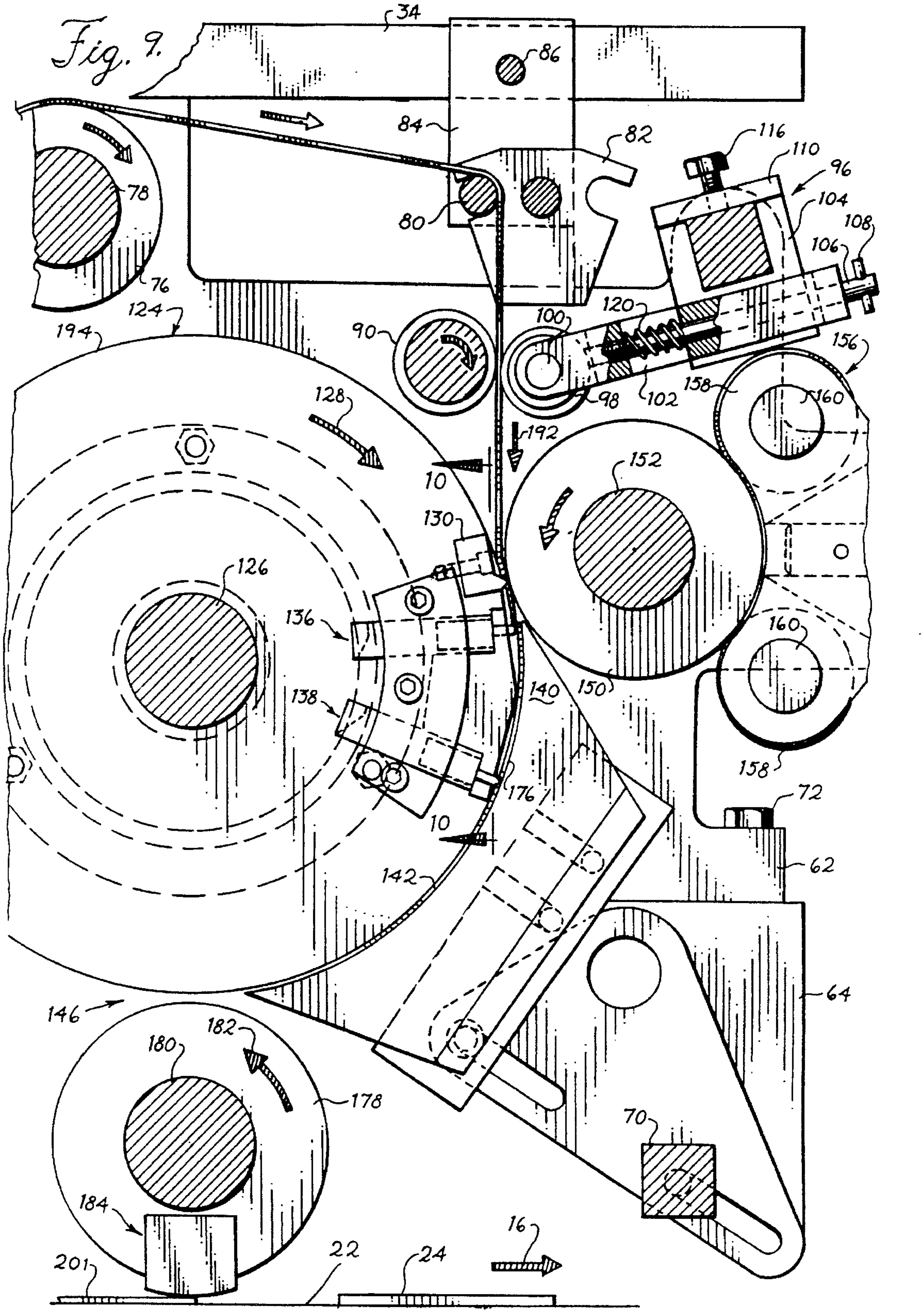
FIG. 9 is a fragmentary cross-sectional view taken along the line 9—9 of FIG. 1.

Referring additionally to FIGS. 2, 3 and 9, webbing 46 is unrolled from reels 28, being pulled in the downward direction of arrow 48. The webbing is drawn over a pair of idler rollers 50, 52 which are mounted by end plates 54, slotted at 56 to receive the rollers. The end plates 54 are generally triangular, and are bolted at 60 to an upper side frame member 62. Referring especially to FIG. 1, the support structure 42 includes, in addition to the upper frame member 62, a lower side frame member 64. As can be seen in FIG. 1, upper and lower side frame members are also provided at the rear side of the machine and are separated therefrom so as to straddle the conveyors 12, 14. A support base 66 is secured to the lower side support member 64 by a series of threaded fasteners 68. Lateral supports such as the internal lateral support 70 visible in FIG. 1 and appearing just above conveyor 14 are provided throughout the interior of apparatus 10 to provide a spacing and rigid securement of the side frame members at the upper end of the apparatus. The upper and lower side frame members 62, 64 are secured together by threaded fasteners 72.

Disposed adjacent the idler rollers 50, 52, at the upper portion of the path of webbing 46 is an idler roller 76 supported on a shaft 78. A guide roller 80 is mounted on a bracket 82 and supports the webbing 46 with a webbing path turned towards a downward direction. Bracket 82 is in turn secured through hangers 84, mounted on guide rails 34 by bolt fasteners 86. As can be seen in the upper portion of FIG. 1, five strips or ribbons of webbing 46 are simultaneously threaded through apparatus 10. As will be seen herein, the five ribbons correspond to the five columns of samples disposed on backing sheet 22.

Disposed beneath guide roller 80 is a driven feed roller 90 carried on a shaft 92. The shaft is driven through a gear set disposed at the rear side of apparatus 10. The gear set is of conventional construction and provides a desired rate of rotation of the feed roller 90.

Referring especially to FIG. 2, a series of pressure roller assemblies generally indicated at 96 are provided, one for each ribbon of webbing 46. The pressure roller assemblies include pressure rollers 98 having a width corresponding to the width of the webbing 46, and are mounted by shafts 100 to telescopically adjustable support legs 102. The support legs in turn are supported within slidable housings 104. A threaded shaft 106 is rotated back and forth in opposite directions by adjustment handles 108. As the threaded shaft 106 is rotated back and forth, the shafts 100 carrying the pressure rollers 98 are reciprocated along the longitudinal axes of support legs 102.

The housings 104 have an upper wall 110 which slides along the upper surface of a square cross-section support bar 112, secured by a shaft 114 to the upper side plate 62. Threaded fasteners 116 secure the housings 104 at a desired position along the support bar 112. As can be seen in FIG. 9, a coil spring 120 is provided in the interior of support leg 102 to provide a resilient mounting of the pressure rollers 98. Thus, the several pressure rollers 98 are readily adjustable to accommodate different lateral spacings between the ribbons of sample webbing and they are also adjustable to accommodate different thicknesses of webbing material. That is, the nip between the passive pressure rollers 98 which are relatively narrow, corresponding to the width of the webbing, and the continuously driven pressure roller 90 spanning the entire width of apparatus 10 can be closely adjusted to accommodate webbing materials of differing thicknesses.

Disposed below feed rollers 90, 98 is a main roller assembly including a drum or roller generally indicated at 124. Referring to FIG. 9, the roller 124 is mounted on a central shaft 126 for rotation in the direction of arrow 128. A cutting blade 130 is carried on the roller 124 and has a zig-zag cutting edge 132 for pinking the webbing material (see FIG. 8). Disposed in front of cutting blade 130 in the direction of rotation of roller 124 are two sets of webbing engaging means designated generally by the reference numerals 136, 138, respectively.

As will be described in greater detail herein, the webbing engagement means 136, 138 each comprise a plurality of retractable pins movable between retracted or material release positions and protracted or material engaging positions. A second type of webbing engagement means (a needle bar) is used in this first preferred embodiment as an additional webbing control device. A second preferred embodiment uses the second type of webbing engagement means as the principle webbing control device and does not require the use of the pin arrays seen here. A stationary backing shoe 140 is mounted opposite roller 124 and includes a part cylindrical, concave surface 142 which aids in guiding cut samples towards a transfer station generally indicated by the reference numeral 146.

Referring again to FIG. 9, an anvil roller 150 is located opposite the cutting blade 130. The anvil roller is mounted on shaft 152 which, like the shafts 78, 126 are suspended between upper side plates 62. Disposed beneath the adjustable pressure roller assemblies is a backing roller assembly having a drum or roller generally indicated at 156. With additional reference to FIGS. 1 and 2, a backing roller assembly 156 includes a pair of backing rollers 158 carried on shafts 160, and positioned so as to bear against the surface of anvil roller 150. The shafts 160 are carried by an adjustable or movable housing 162. The housing is mounted within a frame comprising lateral extensions 164 of the upper side plates 62 and an end plate 166 which spans the extensions 164. The end plate 166 is secured to the extensions 164 by welding or threaded fasteners, or the like expedient. A pair of threaded adjustment members 170 are provided adjacent each end of housing 162 to provide a precise adjustment of the parallelism between the backing rollers 158 and the anvil roller 150, and between the anvil roller and the cutting blade 130 which spans the entire width of the apparatus, extending across all of the ribbons of material webbing.

As mentioned above, the first type of webbing engaging means 136, 138 includes pins which extend into or press against the leading end of the webbing material, upstream of the cutting blade 130. After the cutting blade severs the webbing, a swatch or sample, designated by the reference numeral 24, is formed at the leading end of the webbing. The roller assembly continues to rotate in the direction of arrow 128 so as to move the sample to the transfer station 146 where a second drum or roller in the form of a take down roller 178 is located. The take down roller 178 is mounted on a shaft 180 which, in the first preferred embodiment, is located directly below the shaft 126 of roller 124. The take down roller 178 rotates in the direction of arrow 182, in synchronism with and opposite to the direction of rotation of roller 124. Mounted on take down roller 178 is a needle bar head assembly generally indicated at 184. As will be seen, the head assembly 184 contains a second type of webbing engaging apparatus for releasably engaging the sample 176 when the sample is drawn into contact with take down roller 178 by rotation of roller 124 (see, for example, FIG. 14).

A brief explanation of the operation of apparatus 10 will now be given, to aid in an understanding of the various components of the apparatus. Following that, a discussion of both types of webbing engaging means will be given, and then a more detailed explanation of the operation of apparatus 10 will be set forth.

As mentioned above, a base sheet 22 with adhesive coatings applied, is presented to the upstream end of apparatus 10 (see reference numeral 188 of FIG. 1). After processing, the base sheet, now comprising a portion of a completed display product 20, exits the downstream end 190 of apparatus 10. Apparatus 10 prepares the samples to be displayed from a bulk supply and places those samples in a precisely-positioned two-dimensional array on backing sheet 22, as the backing sheet moves past the apparatus.

Figure 5:
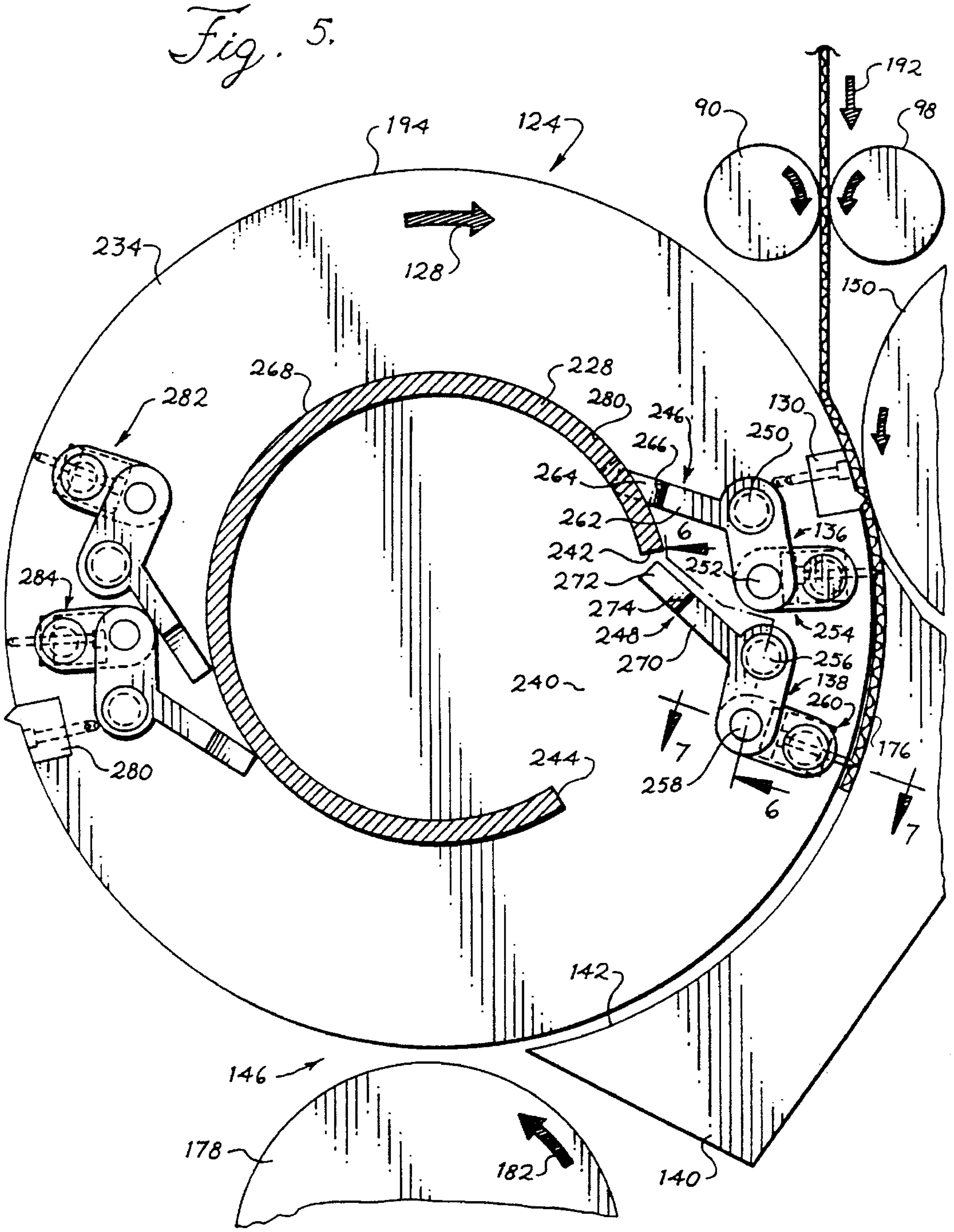
FIG. 5 is a fragmentary cross-sectional view taken along the line 5—5 of FIGS. 3 and 4.

Referring to FIG. 2, webbing 46 is paid out from reel 28 as the webbing passes through the nip between feed roller 90 and pressure rollers 98, being advanced thereby in the feed direction of arrow 192 (see FIGS. 5 and 9). An initial tension is applied to portions of the webbing located between the reel and the feed roller, with the webbing being drawn against the various idler rollers 50, 52 and 80 and the guide roller 78. Subsequently, as additional tension is applied to the webbing the webbing travels over the rollers, and tension in the webbing is increased to a level which insures the controlled movement of the webbing material as it is operated upon by the apparatus.

Referring to FIG. 9, as mentioned above, the first type of webbing engaging means 136, 138 include retractable pins which engage the webbing to insure there is no slippage of the webbing free end with respect to the roller 124. As the free end of the webbing enters the nip between the roller 124 and the anvil roller 150, the pins of the downstream webbing engaging means 138 engage the webbing adjacent the free end thereof. The pins readily penetrate the webbing which is initially backed by anvil roller 150, and which is thereafter backed by the concave surface 142 of guide shoe 140. As the free end of the webbing is drawn in the rotational direction of arrow 128, the pins of the second, upstream webbing engaging means 136 engage a following portion of the webbing to provide an increased engagement of that portion of the webbing in contact with the outer surface 194 of roller 124.

With the pins of both webbing engaging means 136, 138 gripping the free end of the webbing, the webbing is pulled into the nip between roller 124 and the backing roller 150. Shortly thereafter, the stationary cutting blade 130 enters the nip, severing the webbing with a pinking action as the webbing is trapped between the cutting blade and the outer surface of anvil roller 150. The severed portion of the webbing thereby becomes a material sample 24 which, as can now be seen with reference to FIG. 9, for example, is almost entirely captivated between the surfaces 194, 142 of the roller 124 and guide shoe 140.

As will be recalled with discussion referring to FIG. 1, the present invention contemplates the simultaneous processing of a plurality of laterally adjacent webbing. Given the relatively high operating speed of the apparatus and the relatively thin, flexible or pliable nature of the webbing material, edges of the sample could become disturbed by air flow encountered during rapid movement. According to one feature of the present invention, the sample is controlled throughout its entire surface by a relatively low density arrangement of webbing engaging pins aligned in series or rows, one row at each webbing engaging means 136, 138. Because of the location and force generated by the webbing engaging means and the close spacing between the roller surface 194, and the guide shoe surface 142, the webbing sample is completely controlled, free of disturbances due to air flow or the like which could jam the apparatus or require a substantially slower operating speed for the apparatus.

With rotation of roller 124, the sample 24 is advanced to the transfer station 146. During this time, the take down roller 178 rotates in the direction of arrow 182, advancing a needle bar located in head assembly 184 toward the transfer station. As the leading webbing engaging means 138 approaches a "6 o'clock position" diametrically opposite the take down roller 178, the webbing engaging pins thereof are retracted so as not to interfere with head assembly 184 which meets the free end of the sample as the head assembly is brought to a "12 o'clock position" diametrically opposite the roller 124.

Carried within the head assembly 184 is a second type of webbing engagement means, comprising a plurality of extendable needles preferably smaller in size at their tips than the aforementioned pins. The needles as well as the pins need not penetrate the webbing, but can deform the surface thereof when pressed against. As will be appreciated, both types of webbing engagement means can be used with "soft" or deformable materials such as plastics or leathers, in addition to cloth webbing materials. Using the surface 194 of roller 124 as a backing, when the outer surface of the head assembly is in intimate engagement with the leading end of sample 24, the needles are extended to hold the sample captive on the head assembly. As will be seen herein, the needles are mounted in the head assembly 184 for engagement with the webbing in a manner which insures the sample will be held captive despite high rotational speeds and despite the absence of a backing surface. The needles can have varying configurations, as will be explained below.

As roller 178 is brought to the position illustrated in FIG. 9, the sample (not shown) carried by the head assembly 184 is brought into contact with an adhesive coating 201 previously deposited on base sheet 22 at an upstream workstation. The sample is pressed against the adhesive coating with a rolling action and thereby becomes securely bonded to the base sheet 22. Thereafter, the conveyor bearing the base sheet moves in the direction of arrow 16, either toward a subsequent workstation having another apparatus 10 for applying a further row of samples to the base sheet, or to a final destination station for shipping or storage of the finished display product.

As will now be appreciated, it is important that proper timing between the feed roller 90, roller 124 and the take down roller 178 be maintained to insure the above operations occur in a reliable manner. In addition, it is important that the pins on the webbing engaging means 136, 138 and the needles in the head assembly 184 also extend and retract in a timed relationship, coordinated with the rotation of the rollers. Any suitable means of coordinating the relative rotation of the various rollers and roller shafts may be employed. For example, in the Preferred Embodiment, the types of drive means described in the aforementioned U.S. Pat. No. 4,061,521 (which, as mentioned, is herein incorporated by reference) are used to provide the necessary timing. For example, gears 200, 202 are mounted about the shafts 78, 126 of the guide rollers 76 and the roller 124. As described in U.S. Pat. No. 4,061,521, the gear 202 can be loosened for a "slip-fit" with respect to the shaft 126. The handle 204 can be used to rotatably displace the gear 202 with the shaft 126 temporarily blocked against rotation. As the handle is pushed in a counter-clockwise direction, for example, the disk 206 is rotated in a counter-clockwise direction with a stationary pin 208 riding in the slotted portion 210 of the disk 206. Once a desired positioning of the gear 126 relative to the shaft 126 is attained, the gear is locked down to rotate with shaft 126. An intermediate gear not visible in the figures, such as the intermediate gear identified by the reference numeral 331 in the U.S. Pat. No. 4,061,521 is employed to coordinate the rotation of shafts 78, 126.

With reference to FIG. 2, a belt 210 is wound about the shaft 152 of the anvil roller 150, the shaft 180 of the take down bar 178, and is also wound about a roller 212 mounted to a shaft 214. As can be seen in the lower right-hand portion of FIG. 1, the roller 212 is mounted at its ends to end brackets 216 which are slotted at 218 to provide adjustment in the tension of belt 210. The belt provides a drive for the shafts 152, 180 and a timing between the take down roller and the back up roller 152. Also not shown in the figures is a motor, gear mechanism and drive chains substantially identical to those described in U.S. Pat. No. 4,061,521.

The drive system for the various rollers is located at the rear of the machine designated in FIG. 3 by the reference numeral 220. The front of the machine visible in FIG. 1 and designated by the reference 222 in FIG. 3 also contains a gear train and gear drive components. The gear components located at the front of the machine are made readily accessible to an operator who can replace the gears to achieve a ready change in the gear ratio, thereby allowing the operator to readily change the size of the sample severed from the reel of webbing, and to also control the location of the row of samples on the base sheet. Additional details concerning the drive for apparatus 10 may be learned from studying U.S. Pat. No. 4,061,521.

Referring initially to FIG. 3, the roller 124 is mounted by roller bearings 226 to upper sidewalls 62. Part-cylindrical cam members 228 are mounted by bolt fasteners 230 to the upper sidewalls. Pin-operating cranks 232 are mounted to the endwalls 234 of the roller of roller 124. The left-hand portion of FIG. 3, that portion adjacent the front 222 of apparatus 10 and, more particularly, that portion of apparatus 10 adjacent the left-hand or front cam member 228, is illustrated on an enlarged scale in FIG. 4. As shown in FIG. 4, and as can be seen from the cross-sectional view of FIG. 5, the cam member 228 is part cylindrical in configuration, having a slot or gap 240 formed between free ends 242, 244. Adjacent each webbing engagement means 136, 138 is a retracting means in the form of a crank lever, designated by the numerals 246, 248, respectively. The crank lever 246 is pivotally mounted for rotation about a pivot pin 250, with one end of the crank being pinned at 252 to a pin assembly generally indicated at 254. Similarly, the crank lever assembly 248 is pivoted at pin 256 and is pinned at one free end by pin 258 to a retractable pin assembly 260. As will be seen, the crank lever advances or extends the webbing engaging pins 298.

The crank arm 262 of assembly 246 has a stepped free end 264 with a shoulder 266 riding on the outer surface 268 of cam member 228. Similarly, the upstream or leading webbing engagement means 138 includes in its crank lever assembly 248 a crank arm 270 having a stepped free end 272 terminated to the crank arm by an offset or shoulder 274.

As can be seen in FIG. 4, the free end 278 of cam member 228 is stepped at 281 and at 283, so as to allow the crank arms 262, 270 to assume a collapsed position corresponding to a protracted position of the retractable pins. Also visible in FIG. 5 is a diametrically opposed grouping of a cutting blade 280 and upstream and downstream webbing engaging means 282, 284, respectively. As indicated in FIG. 5, the crank arms of webbing engaging means 282, 284 are in a rotated position, being deflected by contact with the outer surface 268 of cam member 228. As will be seen herein, the rotated position of the crank arms causes the retractable pins associated therewith to assume a retracted position, recessed or at least approximately flush with the outer surface of the roller of assembly 124.

Turning additionally to FIGS. 7, 10 and 11, and initially to FIG. 10, the roller 124 includes a cutting blade 130 secured to the roller by threaded fasteners 290. The cutting blade spans the entire width of the roller of assembly 124, between the endwalls 234. Also installed on roller 124, either recessed or imbedded therein, are the webbing engaging means 136, 138. The webbing engaging means 136 is illustrated in cross-section in FIG. 11, and can be seen to comprise an outer aperture plate 292 having a series of pin-receiving apertures 294 formed therein in a linear array. A mounting bar 296 disposed beneath the aperture plated 292 mounts a plurality of pins 298 having sharpened material-engaging tips 300, suitable for either piercing or applying significant pressure to fabric materials. The pins 298 have an opposed rounded end 302 engaging the interior surface of mounting bar 296.

The mounting bar is urged against the aperture plate 292 by a coil spring 304 seated in a pocket or recess 306 formed in the roller of assembly 124 which operates as an advancing means for advancing the pins into engagement with the webbing. As the mounting bar 296 is reciprocated back and forth in the direction of double headed arrow 308, the pins 298 reciprocate within the aperture plate 292. When spring 304 is allowed to fully extend, the mounting bar 296 engages the aperture plate 292 and the pins 298 are in a fully extended or protracted position, such that the sharpened tips 300 project above the surface 194 of roller 124.

Similarly, with reference to FIGS. 7 and 10, the webbing engaging means 138 includes an outer plate 312, aperture at 314 to receive pins 316 having material-engaging sharpened tips 318. The pins 316 have an opposed rounded head 320 disposed within recesses 322 formed in a mounting bar 324. A coil spring 326 disposed in a recess 328 in the roller urges the pins to an extended, or advanced position, with the mounting bar 324 engaging the outer plate 312. With reference to FIG. 5, the crank arm 270 is pinned at 258 to retractable pin assembly 260. The outer plate 312, pins 316, mounting bar 324 and spring 326 together comprise the retractable pin assembly 260 and, as shown in FIG. 7, the retractable pin assembly is pinned by a threaded fastener 332 to an oval connector link 334, which in turn is pinned at 258 to the crank arm 270. With rotation of the crank arm about pin 256, the connector pin 258 is reciprocated in a substantially radially direction, so as to displace mounting bar 324 toward and away from the outer plate 312. This action extends and retracts the pins 316 within the outer plate 312, the pins moving in unison as a linear array.

Thus, as the roller 124 rotates about the axis of its mounting shaft 126, the legs of the several crank arms are brought into and out of engagement with the outer surface 268 of the stationary part cylindrical cam member 228. With reference to FIG. 5, bearing in mind that the cam member 228 is stationary whereas the crank arms travel with the rotating roller, as the crank arms pass the free end 242 of cam member 228, the legs are free to relax, shifting to a radially inward position under the force of coil spring 326 thus allowing the coil spring to assume an extended position. This action in turn brings mounting bar 324 into contact with outer plate 312 and extends pins 316 toward the webbing caught in the nip between roller 124 and anvil roller 150. As the arms pass the step 281, the arms are allowed to retract to a radially inward position.

With continued rotation of roller 124, the crank arms are brought into contact with the free end 244 of cam member 228, thus causing the arms to rotate in a manner which draws the pivot pins 258, 252 of the webbing engaging means in a radially inward direction. This in turn causes the respective mounting bars of the webbing engaging means to be retracted or moved away from the outer plates 292, 312, respectively. Accordingly, the pins 298, 316 are alternately retracted out of engagement with the webbing material. As can be seen from the position of cam member 228 in FIG. 5 and the angled crank arms of the webbing engaging means, the pins are retracted at approximately a "6 o'clock" position, diametrically opposite the center of take down roller 178.

Thus, as can now be seen, the material engaging pins are automatically extended or protracted so as to penetrate or at least bear against the webbing material when the pins are located approximately diametrically opposite the center of anvil roller 150 and continue to engage to webbing until the pins are approximately diametrically opposite the center of take down roller 178. During this time, the material-engaging pins maintain contact with the webbing, particularly at a point in time when the free end of the webbing has been severed by cutting blade 130 to form the sample 24. Importantly, the pins maintain engagement with sample 24 as the sample is drawn through the relatively small size gap between the outer surface 194 of roller 124 and the concave surface 142 of guide shoe 140.

Figure 18:
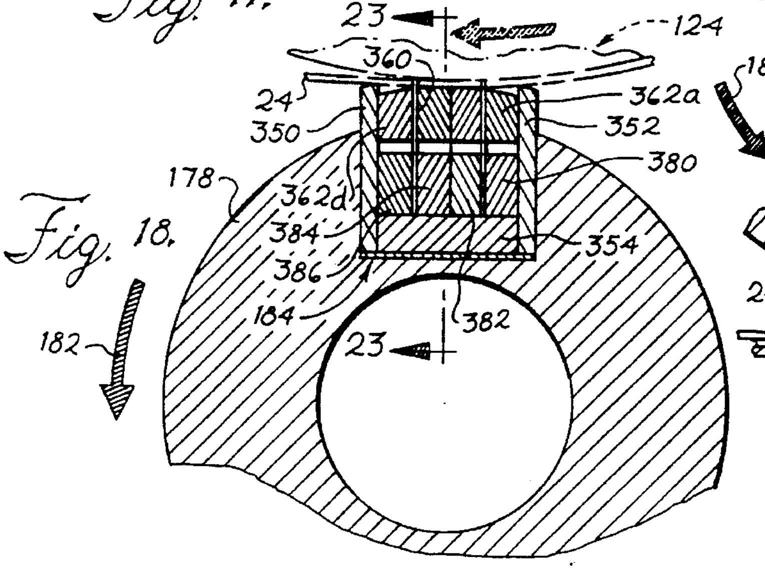
FIG. 18 is a fragmentary cross-sectional view taken along the line 18—18 of FIG. 16 taken at a point in the operation of the apparatus illustrated in FIG. 12.
Figure 19:
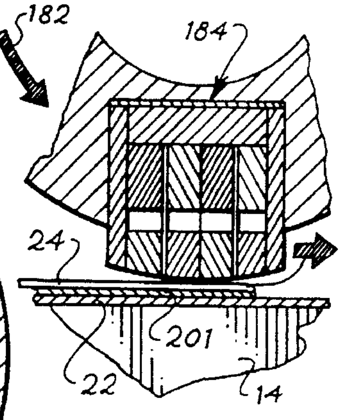
FIG. 19 is a fragmentary cross-sectional view similar to that of FIG. 18 showing transfer of a sample from the needle take-down bar assembly to a base sheet on a moving conveyor.
Figure 20:
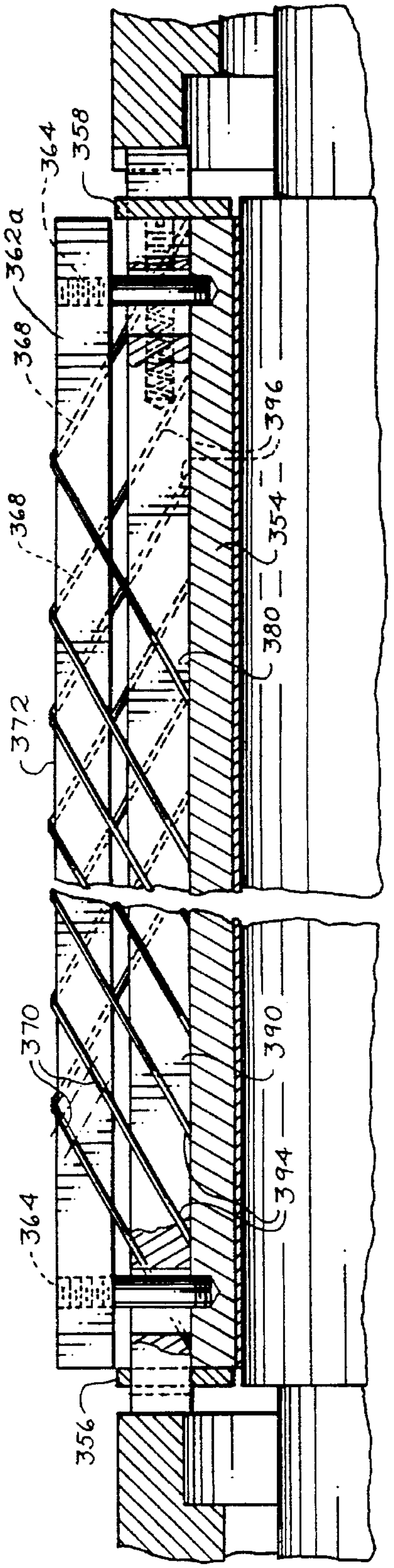
FIG. 20 is a fragmentary cross-sectional view taken along the line 20—20 of FIG. 17.

As mentioned above, with rotation of roller 124, sample 24 is advanced to transfer station 146 where the sample is engaged by the retractable needles of head assembly 184. As seen in FIGS. 16–23, the head assembly 184 is partly recessed on take-down roller 178. As seen in FIGS. 18 and 19, the head assembly includes an outer frame consisting of opposed sidewalls 350, 352 and a bottom wall 354. Also included, as illustrated in FIG. 20, are endwalls 356, 358. Together, the sidewalls, endwalls and bottom wall 354 form a trough-like or open-topped housing within which a system of moving parts is located, and wherein a plurality of fabric-engaging needles 360 are carried for movement to extend and retract with respect to an upper stationary guide or cover plate 362. The needles 360 are of a first, generally straight configuration. As will be seen herein, the needles could also be curved and such is also contemplated by the present invention. The upper plate 362 is secured by threaded fasteners 364 to the stationary housing. The upper plate 362 is removed from FIGS. 16–19 for purposes of clarity. As can be seen in FIGS. 20–23, the upper plate 362 has a series of channels 368 parallel to one another and extending in a first angle direction. Also included in the upper plate 362 are a second series of parallel, but oppositely directed i.e., non-parallel channels 370. The channels 368, 370 are arranged in pairs so as to cross substantially at the upper surface 372 of upper top plate 362, that surface in contact with the webbing material.

Disposed beneath the top plate 362 is an alternating series of mounting bars 380–386. The mounting bars 380–386 all have opposed mating faces which reciprocate or slide one against the other in longitudinal directions causing the needles to be retracted and extended. Looking at the cross-sectional view of FIG. 20, for example, it can be seen that the face 390 of mounting bar 380 is grooved with trough-like recesses 394 all parallel to one another and extending at an angle from the longitudinal axis of the take-down roller. With brief reference to FIG. 16, the adjacent recesses 396 of mounting bar 382 emerge from the upper surface of mounting bar 382 immediately adjacent and opposite the recesses 394 of mounting bar 380. However, the recesses 396 are oppositely directed, as indicated by the phantom lines 396 in FIG. 20. Thus, the recesses of opposed faces of adjacent mounting bars are not aligned in registry, but rather are non-parallel or "crossed" with respect to one another.

Figure 22:
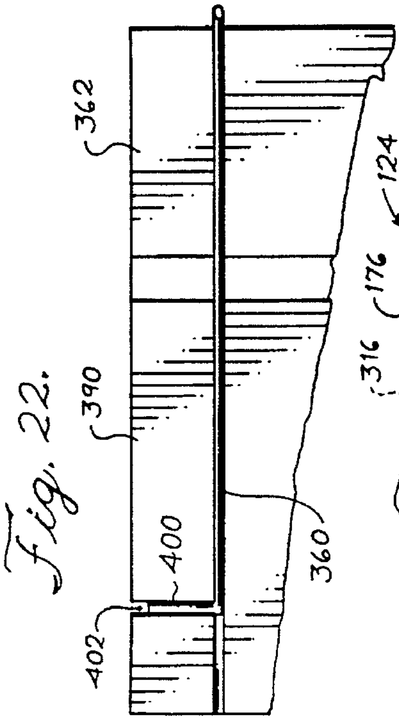
FIG. 22 is a fragmentary portion of FIG. 21 taken along the line 20–22.
Figure 21:
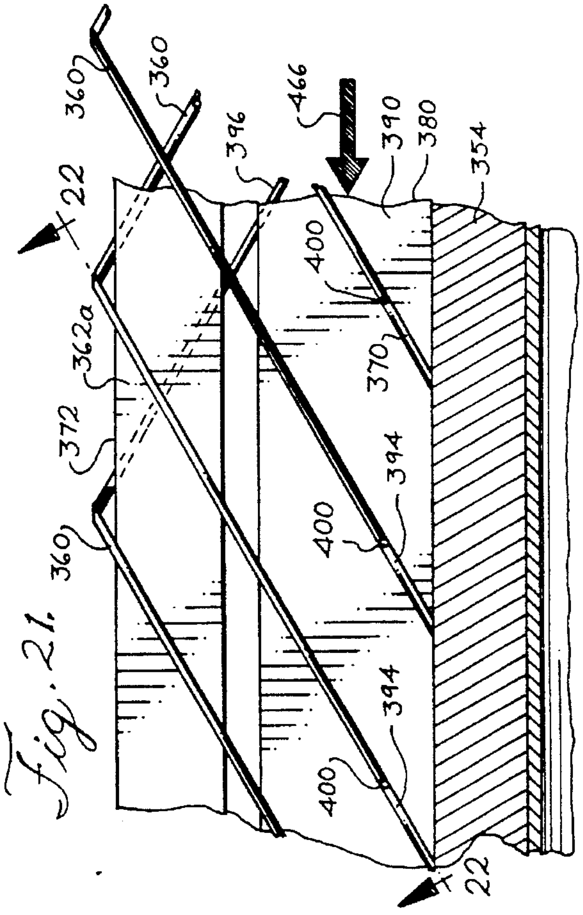
FIG. 21 is a fragmentary portion of the needle take-down bar assembly of FIG. 20 shown in greater detail.

The needles 360 are laid in the recesses of the mounting bars, and accordingly are retained in those recesses without jamming as adjacent mounting bars are moved across one another. As indicated in FIG. 21, needles 360 have hook-shaped ends 400, preferably bent and right angles to the major body portion of the needles. The mounting bar 390 has laterally extending apertures 402, extending in a direction generally normal to the longitudinal axis of the mounting bar, for receiving the hook-shaped end portion of the needles. Also visible in FIGS. 21 and 22 are the slotted recesses 396 which receive the needles 360. Preferably, the recesses 396 are deep enough so that the needles, when installed in the mounting bar and top plate, do not extend beyond the major surface thereof, thus allowing two mounting bars and top plates to be mated together face-to-face and thereafter longitudinally displaced one with respect to the other.

The top plate 362 may be formed as a single unitary member. However, it is preferred that the top plate 362 be formed of four generally coextensive, longitudinally-extending members **362*a*–362*d*. Each top plate member is secured to the housing portion of the head assembly 184 by screw fasteners 364**.

Figure 16:
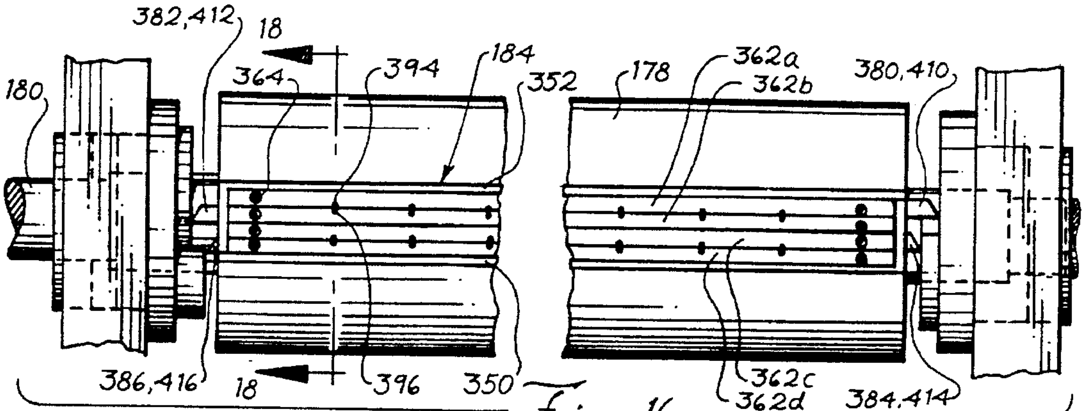
FIG. 16 is a fragmentary top plan view of the needle take-down bar assembly of the apparatus.

The mounting bars 380–386 have lateral dimensions corresponding to those of the top plate members, as can be seen in FIGS. 18 and 19, for example. Thus, the top plate members and the mounting bars are arranged in pairs, one above the other. The mounting bars are however considerably longer than the corresponding top plate member. For example, referring to the upper right hand portion of FIG. 16, the mounting bar 380 has a plate or extension 410 extending beyond the overlying top cover member **362*a*. According to one feature of the present invention, the extensions of the mounting bars alternate from one mounting bar to the other. Thus, the next mounting bar to have a protruding extension at the right hand portion of FIG. 16 is the third mounting bar 384. The extension 414 of mounting bar 384 can be seen in FIG. 16**, and as will be explained herein, is in a depressed position. Referring to the left-hand portion of FIG. 16, the second and fourth mounting bars 382, 386 have protruding extensions 412, 416.

Figure 17:
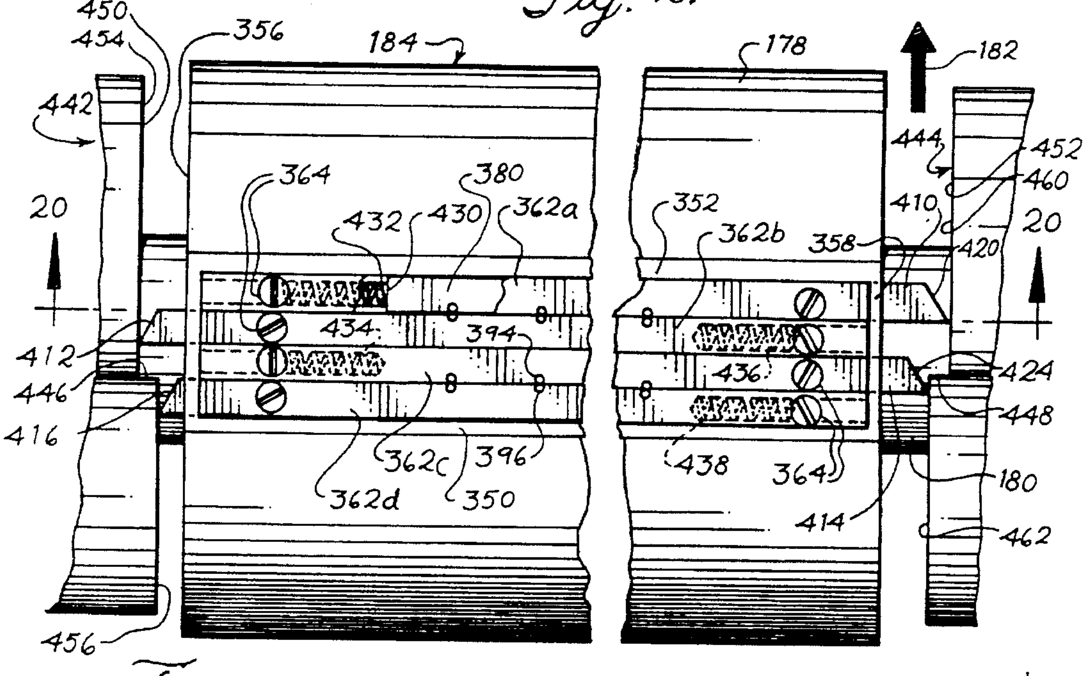
FIG. 17 is a fragmentary top plan view partially broken away, showing the needle take-down bar assembly of FIG. 16 in greater detail.

Referring especially to FIG. 17, the extensions 410, 416 have angled camming edges 420, 426. As mentioned, the mounting bars 380–386 are mounted within a framework consisting, in part, of sidewalls 350, 352. Looking at FIG. 17, the mounting bar 380 has an end 430, opposite the extension 410, disposed adjacent endwall 356. A coil spring 432 is disposed between endwall 356 and the end 430 of mounting bar 380, thus biasing the mounting bar in a direction to extend, i.e., cause protrusion of the extension end 410. The mounting bar 384 is biased in a similar direction by a coil spring 434 to bias the mounting bar in a longitudinal direction, away from endwall 356.

The intervening mounting bars 382, 386 which are alternated with the aforementioned mounting bars 380, 384 are biased for outward movement in the opposing longitudinal direction by coil springs 436, 438, respectively. As mentioned above, the take down roller 178 is mounted by shaft 180 for rotation in a direction of arrow 182. Thus, with rotation of the take up roller the elongated sidewall 352 of the head assembly becomes the leading end of the assembly, with the sharp edges of the camming ends being located in a trailing position. Stepped camming members 442, 444 are mounted on the lower sidewall members 188, 190 of the apparatus frame, being arranged along the axis of take down shaft 180 so as to generally oppose one another. Included in the camming members 442, 444 are step portions 446, 448, respectively dividing the faces 450, 452 into protruding and recessed portions. For example, the camming face 450 of cam member 442 is divided into recessed and protruding portions 454, 456, respectively. Similarly, the cam face 452 of cam member 444 is divided by step 448 into recessed and protruding portions 460, 462.

Thus, as take down roller 178 rotates in the direction of arrow 182, the leading mounting bar 380 travels across the protruding cam face 462 and, with continued rotation, passes step portion 448 to the recessed cam face 460, thereby allowing the mounting bar to extend to a protracted position under the force of coil spring 432. As illustrated in FIG. 17, the next mounting bar 382 which is alternated in position with respect to the mounting bar 380, has a camming end 412 with a camming edge 422 engaging the recessed cam face 454 so as to also assume a protracted or extended position under the force of bias spring 436.

The next mounting bar in sequence, mounting bar 384 has a camming edge 424 engaging the protruding camming face 462, which puts coil spring 434 in a compressed or stored energy configuration. The remaining mounting bar having an alternately positioned cam edge 426 is also in a retracted or compressed position, engaging the protracted camming face 456. Thus, as take down roller 178 is rotated in the direction of arrow 182 the mounting bars are reciprocated in their respective longitudinal directions, sequentially, with the ends of the mounting bars providing the camming motion, alternating from one lateral end of the take down roller to the other.

Referring now to FIG. 21, as mounting bar 380 engages the protruding cam face 462, engagement therewith by the cam edge 420 causes the mounting bar to contract in the direction of arrow 466. This movement tends to compress coil spring 432 storing energy in the spring which is later employed to move the mounting bar to the extended position as illustrated in FIG. 17. As the mounting bar is retracted, and displaced toward the endwall 356, the needle-mounting apertures 402 engaging the needle free ends 400 are also moved in the direction of arrow 466, thus causing the portions of the needles 360 lying within the top plate member 362*a* to travel in a generally longitudinal direction so as to cause the needle free ends to retract, preferably with the needle free ends lying below the surface 372 of the top plate member. Depending on the relative proportions of the needle cross-section, the size of the needle-receiving apertures and the thickness of the top plate 362, the needles may bend slightly when retracted, and thus the generally straight needles 360 are preferably made of spring steel wire. The plurality of needles mounted in bar 380 are simultaneously retracted like amounts as the camming end 420 of the bar engages the protruding camming face 462. As will be seen herein, curved needles could also be used. However, it is preferred that even curved needles be made of a material exhibiting resilience, although such is not necessary to practice the present invention.

Figure 23:
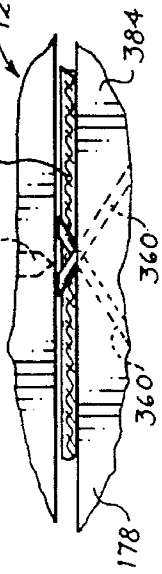
FIG. 23 is a fragmentary portion of FIG. 21 showing the webbing-engaging needles in a protracted position at a point in the sequence of operations of the apparatus corresponding to that illustrated in FIG. 14.

As mentioned above, the adjacent mounting bar 382 contains a like number of needles which are "oppositely" directed with respect to the needles mounted in bar 380, so as to "cross-over" those needles in the manner shown in FIGS. 20, 21 and 23. In FIG. 20, the point of crossing of a pair of needles from adjacent mounting bars occurs at or slightly above the surface 372 of the head assembly top plate. This alignment is shown in greater detail in FIG. 23 which looks into the nip between roller 124 and the take up roller 178, such that the sample 24 is advancing in a direction out of the plane of the drawing. Alternatively, as shown in FIG. 21, the point of crossing between pairs of overlapping needles can occur immediately above the surface 372 of the head assembly top plate.

As a further alternative, the point of crossing could even be positioned slightly below the surface of the top plate, but it is generally preferred to have the crossing point occur within the thickness of the sample to be engaged, this having been found to provide the most positive gripping of the sample. The point of crossing can be adjusted by shifting the needle-receiving grooves formed in the mounting plates. For example, as shown in FIG. 17, the grooves 394, 396 of adjacent top plate members 362*c*, 362*d* are positioned directly opposite one another, it being understood that the grooves underlying the surface openings extend at oppositely directed angles into the plane of the drawing. By shifting the openings 394, 396 relative to one another, different offsets among overlapping needles and hence their point of crossing can be altered, as desired.

The stationary cam members 442, 444 lying at the ends of the take down roller 178 are angularly positioned about the axis of the take down roller so as to insure the desired timing when the needles project above the surface of the head assembly top plate. Preferably, the cam members 442, 444 are set such that the needles protract when the head assembly is at a "top dead center" position, as illustrated in FIG. 18, at a point in time when intimate engagement between the fabric sample and the top surface of the head assembly top plate is insured, with the roller 124 thereby providing a backing to insure that projection of the needles causes penetration of the needles into the fabric, rather than an outward displacement of the fabric away from the head assembly.

With reference to FIGS. 9 and 19, rotation of the take down roller in a direction of arrow 182 continues with the needles fully advanced, the sample 24 being carried to the surface of conveyor 14 and to the desired position on a base sheet 22 which is carried on the conveyor. As mentioned, the desired position on base sheet 22 preferably has been coated ahead of time with an adhesive 201. As the head assembly 184 arrives at a "bottom dead center" position, the camming edges of the needle mounting bars pass over the respective cam steps 446, 448 to assume a retracted position, with the needles 360 thereupon becoming retracted so as to avoid interference with the base sheet or any adhesive coated thereon. As illustrated in FIGS. 9 and 19, the head assembly 184 presses the sample 24 in intimate engagement with the top surface of the coated base sheet, thereby securing the sample thereto. The take down roller 178 thereupon continues rotation toward a top dead center position whereupon the cycle is repeated.

As indicated in FIG. 5, two full sets of cutting blades and upstream and downstream releasable webbing engaging pins are provided at diametrically opposite positions on roller 124. If desired, the diameter of the take down roller can be increased to accommodate multiple head assemblies in a similar manner, thereby creating the possibility that several head assemblies will simultaneously carry samples toward the base sheet to provide increased production rates. Such however has not been found to be necessary.

Figure 12:
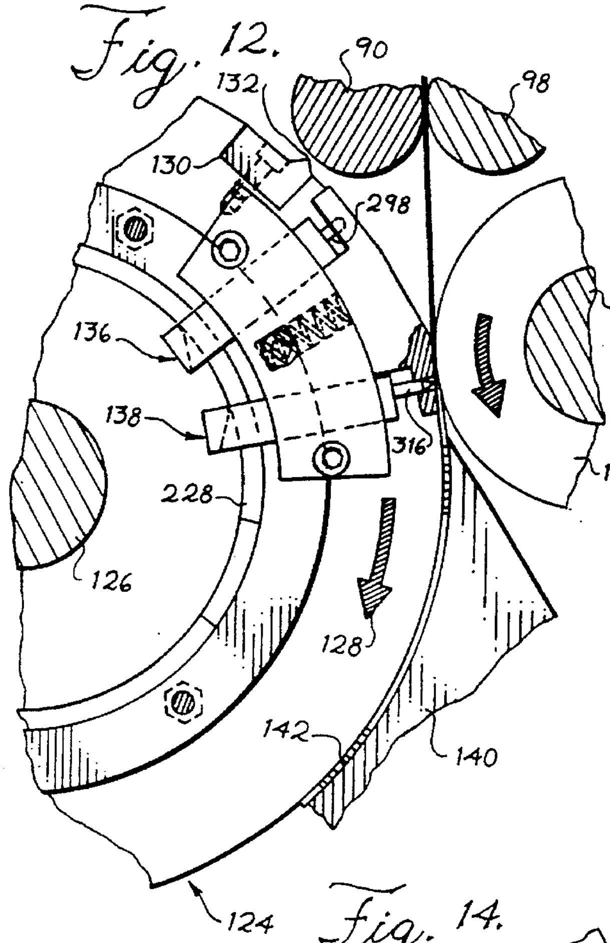
FIGS. 12–14 are fragmentary cross-sectional views of a portion of FIG. 9 showing a sequence of operations of the apparatus.
Figure 13:
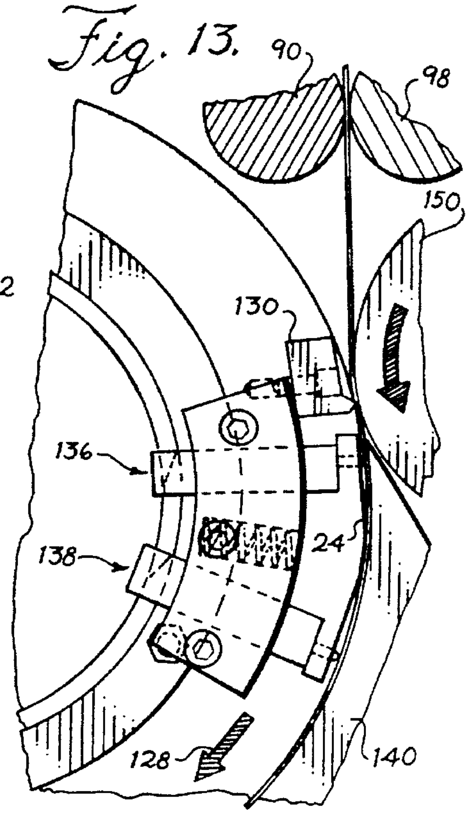
Figure 14:
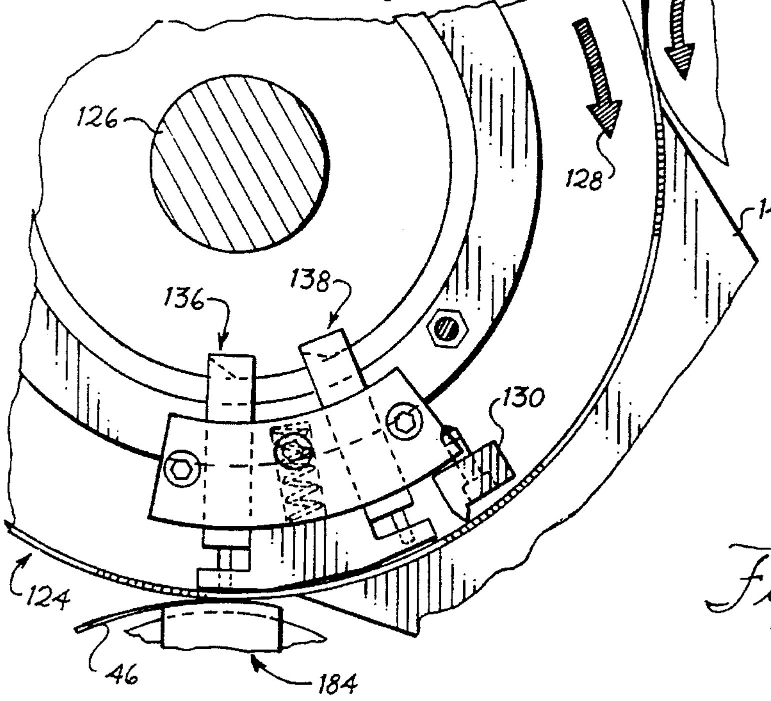
Figure 15:
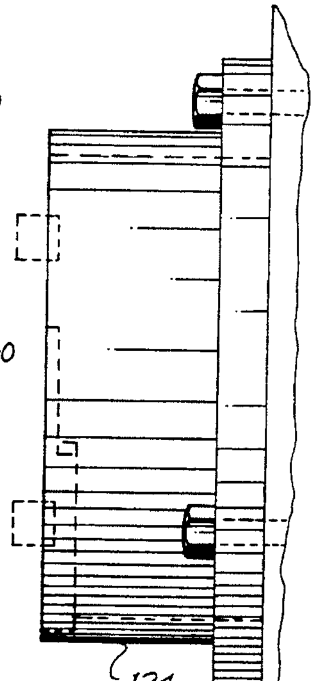
FIG. 15 is a fragmentary side elevational view of the drum of FIG. 14.

With reference to FIGS. 12–14, operation of the retractable pin and needle webbing engagement means according to aspects of the present invention will be explained. Referring first to FIG. 12, the webbing exits the nip between feed roller 90 and pressure roller 98, advancing to the nip between roller 124 and anvil roller 150. At this point in time the legs of both webbing engaging means 136, 138 ride on the outer surface 268 of stationary part-cylindrical cam 228, and the pins 298, 316 of the webbing engaging means are retracted.

Shortly after the time when the webbing passes through the nip between roller 124 and anvil roller 150, the arms of the webbing engaging means 136, 138 drop off the free end 242 of stationary cam 228 and the linear arrays of pins 298, 316 are advanced to extend to a protracted position and with guide shoe 140 acting as a backing support, the pins either penetrate or press tightly against the webbing. Thereafter, with both arrays of pins 298, 316 engaging the free end of the webbing, the cutting blade 130 is advanced toward the anvil roller 150 thereby severing the webbing with the zig-zag cutting edge 132. At this point in time, either the feed to roller 90 or the pressure exerted by roller 98 may be interrupted to momentarily prevent feeding additional material immediately behind the newly formed cut end of the webbing sample. However, it is preferred that the webbing feed continue without interruption or slowing. With continued engagement by pins 298, 316, roller assembly 128 continues to advance in the direction of arrow 128.

Eventually, the sample 24 is brought to the transfer station 146 where the leading end of the sample is pressed in the nip between roller 124 and head assembly 184. At or immediately before this moment, the crank arms of releasable engaging means 136, 138 engage the outer surface 268 of stationary cam 228, the pins 298, 316 thereupon becoming retracted. Substantially concurrently therewith the camming edges of the needle mounting bars pass over the cam steps, to ride on the recessed cam faces thereby extending the needles 360 to engage the free end of sample 24. Thereafter, the roller 124 continues rotation to repeat the webbing, engaging, severing and transporting cycle. During this time, take down roller 178 continues to rotate in the direction of arrow 182 bringing the leading end of sample 24 to the position shown in FIGS. 9 and 19.

Immediately before the time when protracted needles 360 might otherwise engage or closely approach the base sheet 22, the camming edges of the needle-mounting bars engage the protracted cam faces 456, 462 thereby compressing the mounting bars against the coil springs 432, 434, 436 and 438 so as to retract the needles. The outer surface of head assembly 184 thereupon presses the sample into engagement with the base sheet. For the arrangement shown in the figures, the take down roller 178 preferably rotates twice as fast as the roller 124 with two rotations of the take down roller and the associated cycle of needle retraction/protraction associated therewith occurring for each complete rotation of roller 124.

Referring now to FIGS. 24–28, an alternative embodiment of a head assembly or needle bar is generally indicated at 500. The needle bar 500 includes upper plate means 502 and an outer housing including sidewalls 504, 506 and a bottom wall 508. As will be seen herein, construction of the needle bar 500 is similar to that of the aforedescribed head assembly 184, but is of a generally simpler construction. For example, referring to FIG. 28, needle bar 500 includes only three needle mounting bars 510–514. The needle mounting bars 510, 514 are similar to the aforedescribed mounting bars *362a*, *362d*. The sole intermediate mounting bar 512 has needle-receiving grooves formed on its two opposite major faces, and thus takes the place of the two mounting bars *362b*, *362c* of head assembly 184. As before, the mounting bars of needle bar 500 have protruding ends with cam surfaces 516–520. As will now be appreciated, actuation of needle bar 500 is faster and less complicated than with head assembly 184.

Figure 29:
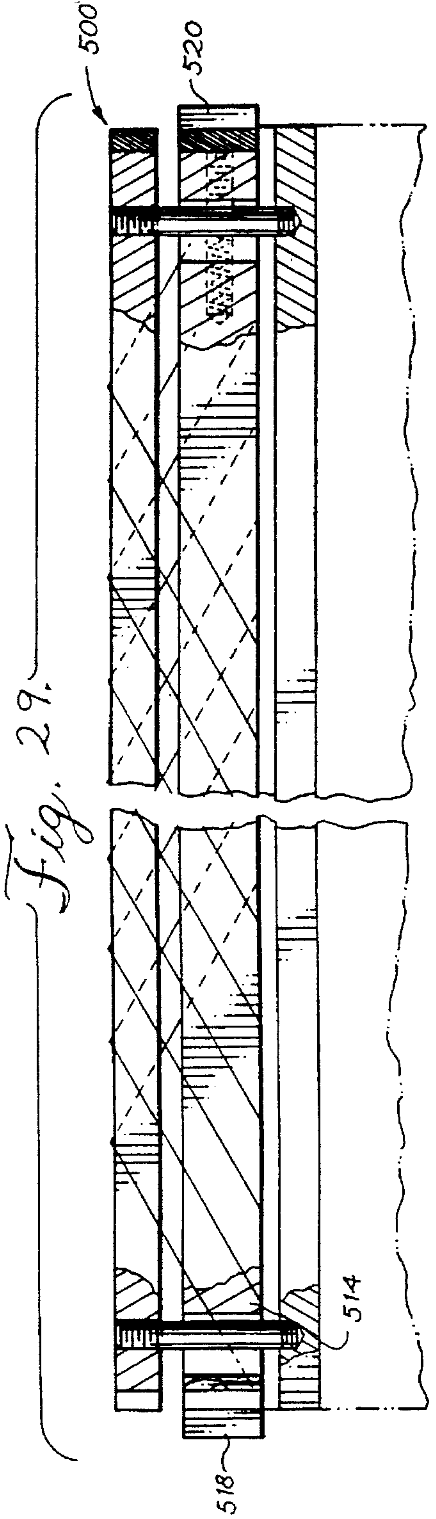
FIG. 29 is an elevational view thereof shown partly in cross-section.
Figure 28:
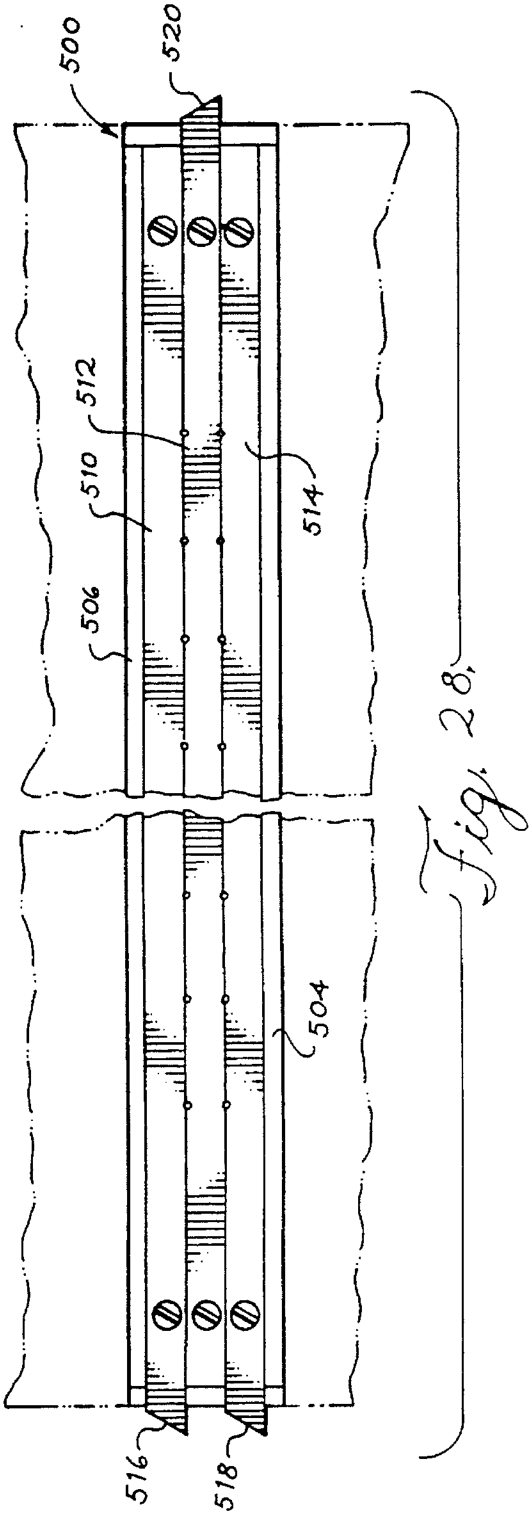
FIG. 28 is a top view of the needle bar.

Referring to FIGS. 26 and 27, the needle bar 500 also uses a plurality of needles 360 having hooked ends 400. FIG. 26 shows the needles in a retracted position, with their sharpened free ends below the upper surface of plate 502 and FIG. 27 shows the needles in an extended position, protruding above the upper plate 502. If desired, the upper plate means 502, which spans the three mounting bars 510–514 can be made of a single unitary construction. However, as with the preceding head assembly 184, it is generally preferred that the plate means 502 be divided into three portions, each of a size to overlie the respective mounting bar located therebelow. As indicated in FIG. 29, the needles on either side of the central mounting bar 152 are inclined in opposite directions, so as to form the criss-cross pattern visible in FIGS. 2–9.

As mentioned, curved needles could also be employed, and only relatively minor changes to the needle bar assemblies need be made to accommodate the curved needles. Preferably, the needles are curved at their tips, and have generally linear bodies, although other body shapes could also be used. The curves may comprise arcuate portions of a circle, or may have a non-circular shape.

Figure 42:
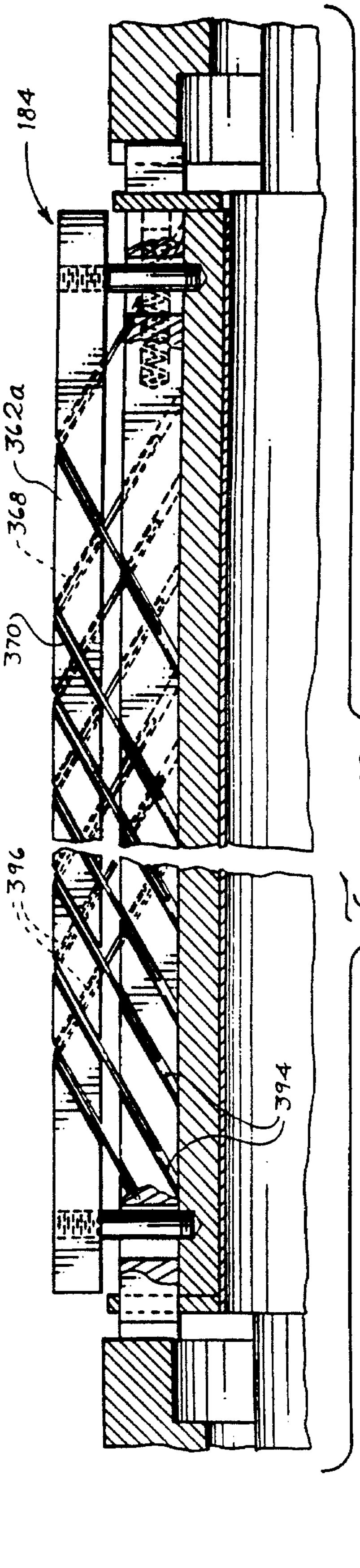
FIG. 42 is a fragmentary cross-sectional view similar to that of FIG. 20, but showing optional, curved needles.
Figure 44:
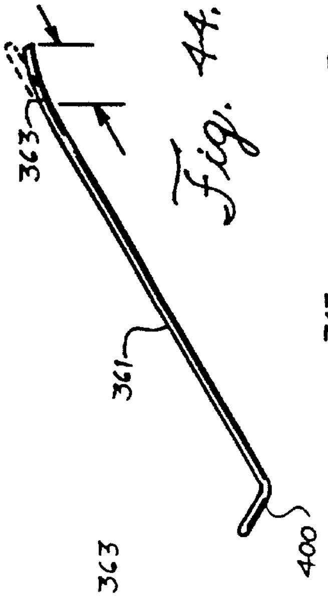
FIG. 44 is a perspective view of a curved needle used in the needle bar assembly of FIGS. 42 and 43.
Figure 45:
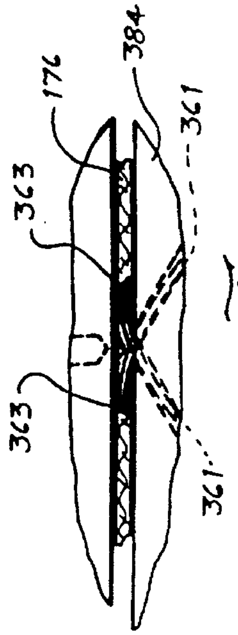
FIG. 45 is a fragmentary portion of FIG. 43 shown on an enlarged scale, with the curved webbing-engaging needles in a protracted position at a point in the sequence of operations of the sample-making apparatus according to the present invention.
Figure 43:
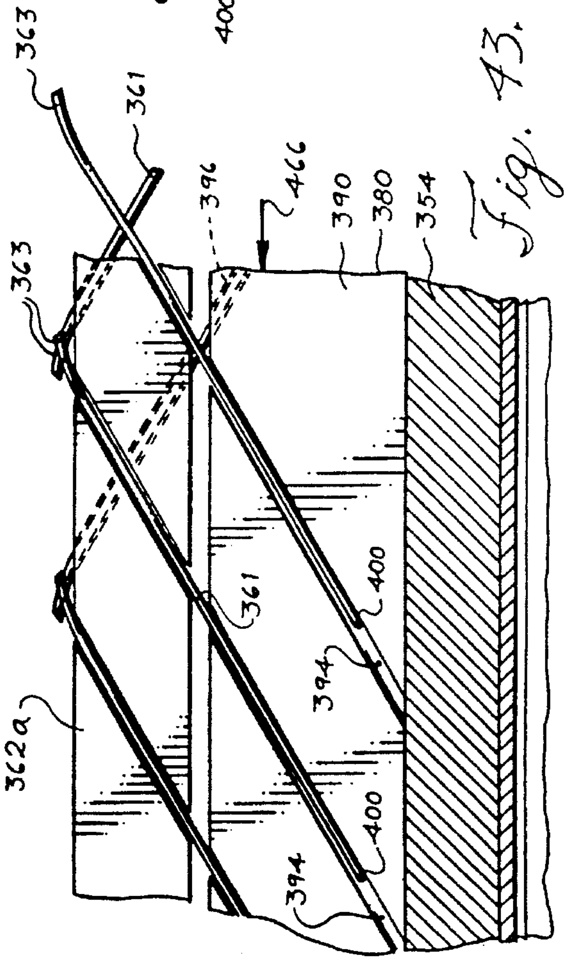
FIG. 43 is fragmentary view thereof shown on an enlarged scale.

Referring to FIGS. 42–45, the needle bar head assembly 184 is shown with optional curved needles 361 illustrated in FIG. 44. The curved needles 361 generally resemble the needles 360, but have a curved head 363, which is preferably sharpened at the tip for ease of penetration within a sample 176, as illustrated in FIG. 45. The needles 361 have hooked-shaped ends 400 as above, for engagement with mounting bars 380. The needles 361 are preferably formed of a spring steel composition or other similar material exhibiting resilience. As indicated in FIG. 44, the curved tip 363 is straightened to some extent when the needles are retracted into the take down bar assembly, as illustrated in FIG. 42. When the needles are extended, as illustrated in FIGS. 43 and 45, the curved tips 363 resume their original positions. As can be seen in FIG. 45, the curved tips 363 extend generally parallel to the major faces of sample 176 to provide a very substantial engagement thereof. The curved needles may be desired in applications where the samples 176 have a particularly open or loose weave.

If desired, the recesses 394, 396 and channels 368, 370 may be modified to accommodate the curved tips 363, so as to reduce the bending distortion thereof when the needles are fully retracted. For example, the channels and recesses can be flared or the diameters thereof can be enlarged to reduce the bending distortion. Alternatively, the channels 368, 370 can be curved to either complement the curvature of the tips 363 or may have a lesser curvature oriented in the same direction, so as to reduce bending deformation of the curved tips 363. In the commercial embodiment of the sample forming apparatus, minimal modifications have been found necessary to accommodate the curved needles 361 and the improved retention offered by the parallel orientations illustrated in FIG. 45 (i.e., parallel to the major surfaces sample 176) have been found to be significant. The curved needles could, of course, be employed in other embodiments of needle bar assemblies, such as the needle bar assembly 500 illustrated in FIGS. 24–29.

Figure 30:
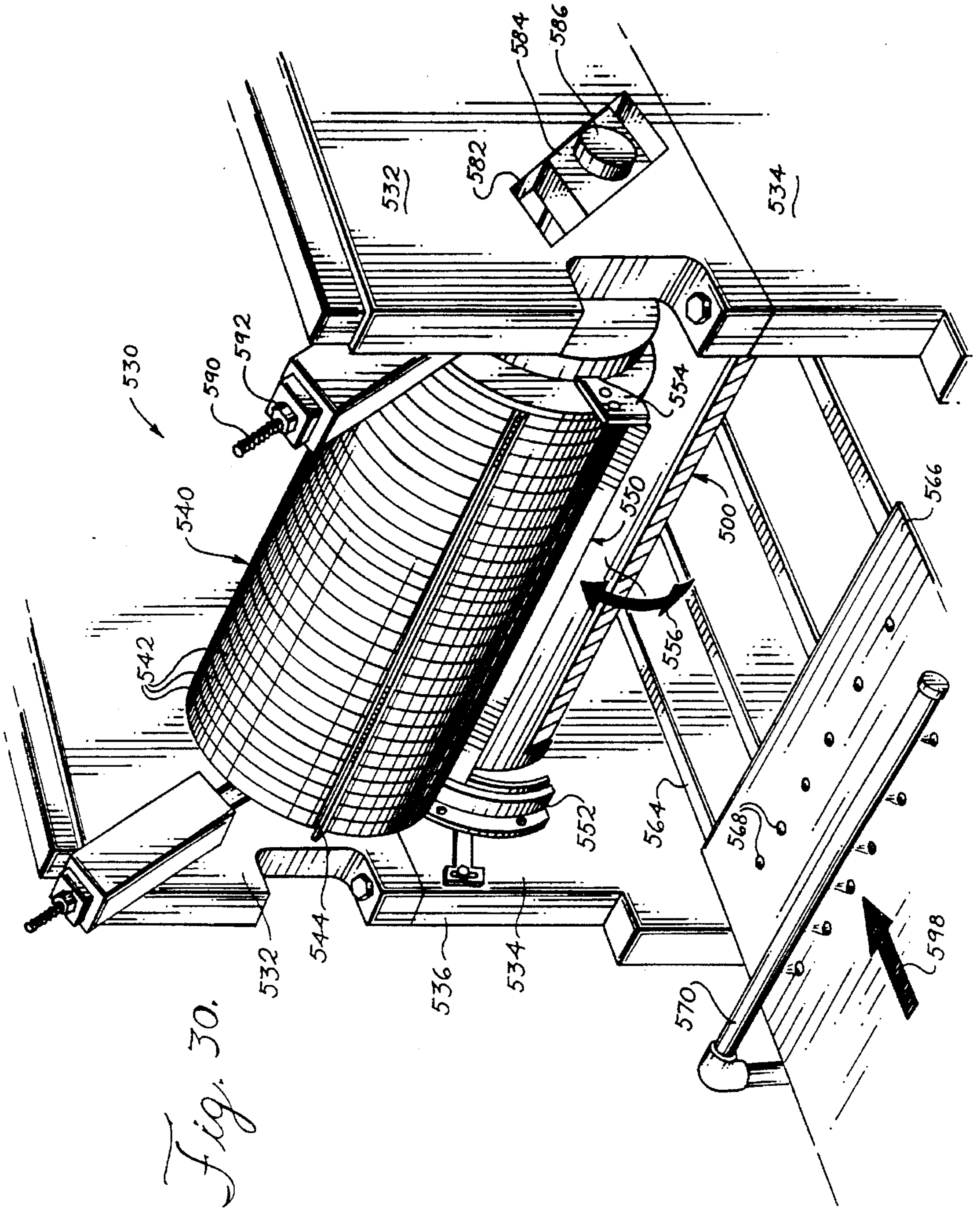
FIG. 30 is a fragmentary perspective view of an alternative display fabricating apparatus according to principles of the present invention.
Figure 31:
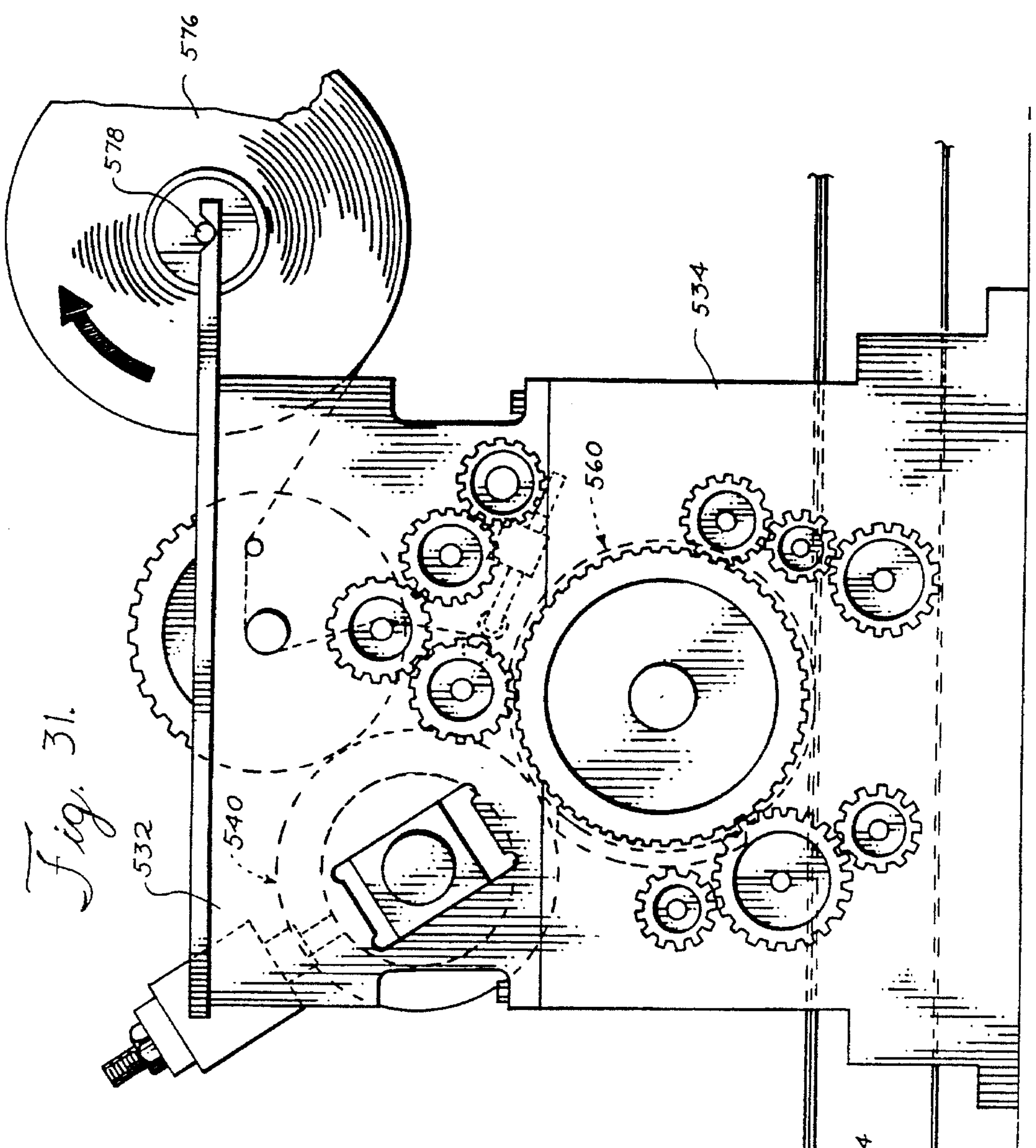
FIG. 31 is a fragmentary side elevational view thereof.
Figure 31:
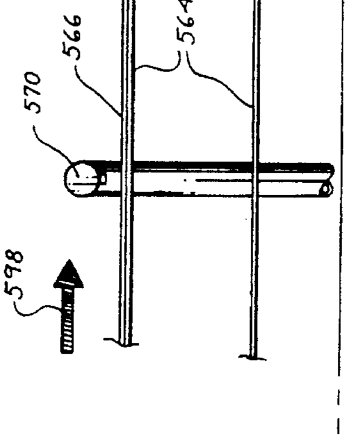

Referring now to FIGS. 30, 31, an alternative embodiment of the display fabrication apparatus is generally indicated at 530. Apparatus 530, as will be seen herein, has many of the features of apparatus 10 described above. For example, the upper and lower sidewall members 532, 534 are similar to the members 62, 64 described above with respect to FIG. 1, except for minor changes such as a recess 536 formed in the upper part of sidewall members 534. FIG. 30 shows a main roller assembly including a roller generally indicated at 540. The main roller is comprised of an alternating series of larger diameter and smaller diameter disk portions, stacked end-to-end. Preferably, the roller is made from a unitary metal cylinder with a series of spaced-apart grooves formed in the outer surface thereof. As will be seen herein, the grooves 542 receive stripping fingers that prevent fabric material from clinging in the grooves. Also shown in FIG. 30 is a cutting blade 544 carried on the main roller, and generally resembling the arrangement of FIG. 8.

A travelling backing plate assembly generally indicated at 550 is mounted on guide shoes 552 which are generally arcuate in configuration so as to guide the travelling backing plate for reciprocating arcuate, preferably part circular, movement in the direction of arrow 556.

A take down roller assembly includes a drum or roller generally indicated at 560 and a needle bar 500. End guides 554 of clear plastic are mounted on the ends of the roller assembly 540.

Figure 32:
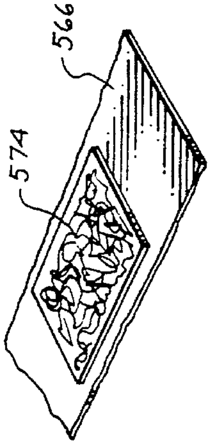
FIG. 32 is a fragmentary view of a display assembly fabricated using apparatus according to the present invention.

FIG. 30 also shows a conveyor 564 carrying a base sheet 566 of paper or other suitable material which is coated with an adhesive 568 by a dispense head 570. The adhesive is distributed throughout the backing sheet in a predefined pattern, so as to secure swatches of fabric samples 574 illustrated in FIG. 32 on the backing sheet. Referring briefly to FIG. 31, a plurality of feed reels of fabric webbing 576 are supported on a common spindle 578, and are preferably arranged so as to present a plurality of side-by-side strips of fabric material to apparatus 10. FIG. 30 shows an arrangement for six fabric strips to be located across the width of backing sheet 566.

As will be seen herein, apparatus 530 cuts each of the strips of fabric into swatches of predefined length, and places those swatches on the backing sheet 566, so as to be secured thereto by the adhesive 568. Various arrangements for aligning the components of apparatus 530 are provided and will not be described herein in any great detail, since various expedients known in the art, can be used to achieve the desired adjustments. For example, the main roller assembly 540 can be adjusted to achieve a desired spacing with respect to the take down roller 560. Apertures 582 are formed in upper sidewall portions 532 to allow mounting blocks 584 carrying a central shaft 586 of the main roller assembly to be moved toward and away from the take down roller 560. A threaded shaft 590 and threaded fasteners 592 are provided for the accurate adjustment of mounting blocks 584.

Referring now to FIG. 31, a side rail 596 extends from the top of upper sidewall 532 to support the spindle 578. The conveyor belt 564 advances the base sheet in the direction of arrow 598. FIG. 31 shows several gear trains for driving the main roller assembly 540, take down roller 560 and related rollers in a timed fashion. Other arrangements for driving the rollers will occur to those skilled in the art, and are contemplated by the present invention, as well as the arrangements of U.S. Pat. No. 4,061,521 herein incorporated by reference.

As mentioned above, apparatus 530 functions in a manner similar to apparatus 10 described above, with cutting blade 544 carried on the main roller 540, and the needle bar 500 carried on take down roller 560.

Webbing 576 travels over guide rod 602 and passes between feed roller 604 and a pressure roller 606 carried on a square cross-section support shaft 608. Pressure roller 606 is mounted in a carriage 610 which slides along support shaft 608, being secured thereto with a set screw 612. Coil spring 614 biases pressure roller 606 into engagement with feed roller 604. The webbing 576 is fed in the direction of arrow 616, preferably on a continuous, constant speed basis. The webbing is cut into a series of sample pieces by cutting blade 544, and each time the webbing is cut a new free end is formed. Rollers 604, 606 feed the free end of the webbing as take down roller 560 completes the first cycle of rotation following the cutting operation. The needle bar 500 is preferably located downstream of the point of contact on roller 560 made by cutting blade 544. Thus, the roller 560 must be rotated approximately one full revolution before the needle bar 500 is located underneath portions of webbing 576 located adjacent the webbing free end, in position to engage the cut piece of webbing. The cut piece is then delivered to the backing sheet 566. With this overview, the cutting and sample delivery operations will be described in greater detail.

As take down roller 560 rotates in the direction of arrow 620, the webbing, which is engaged by needle bar 500, is wrapped about the outer surface of the take down roller. The main roller 540 rotates in an opposite direction, indicated by the arrow 622 and, with rotation, cutter head 544 is brought into contact with the webbing 576, so as to sever the webbing, using the surface of roller 560 as an anvil or backing surface for the cutting operation. With appropriate controls, which will not be described herein, the timing of rotation of the main roller 622 and take down roller 620 can be varied so as to vary the length of webbing material between the needle bar 500 and the point of cutting, where cutter head 544 severs webbing 576. Step cams are provided on the side frame members so as to operate needle bar 500 in the manner as described above with the respect to the head assembly 184.

According to one aspect of the present invention, a travelling backing plate assembly 550 is provided to guide the cut free end of the webbing as it is pushed in a downstream direction of arrow 616 by rollers 604, 606 and to assist the needles of needle bar 500 in engaging the leading end of fabric 576. As with the head assembly 184 (which could also be used with backing plate assembly 550), needle bar 500 carries a plurality of needles of one or more differing shapes (i.e., straight or curved), which are outwardly extended beyond the upper face of the needle bar entering into the fabric of webbing 576. The travelling backing plate assembly 550 guides the cut free end of the fabric webbing to prevent bunching or snagging of the webbing in the apparatus.

Figure 37:
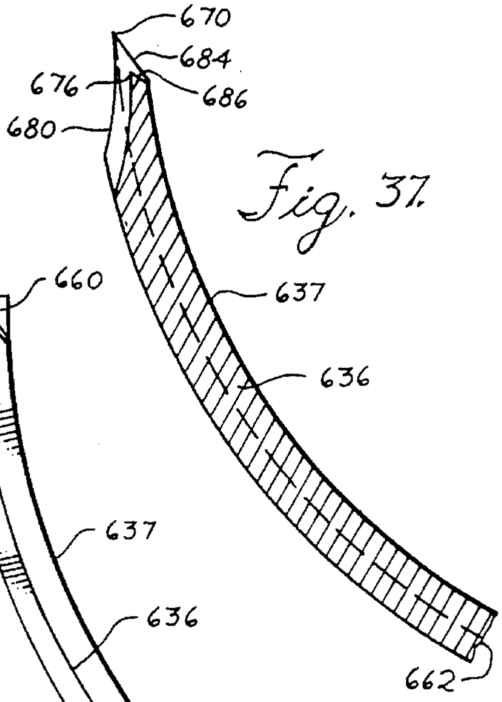
FIG. 37 is a cross-sectional view taken along the line 37—37 of FIG. 35.
Figure 36:
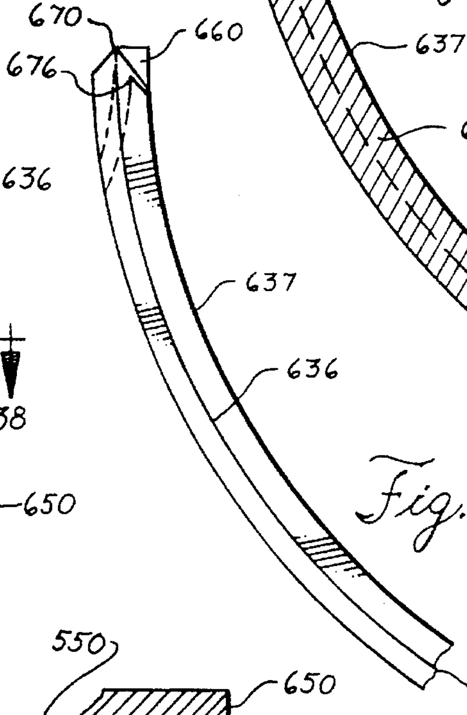
FIG. 36 is an end elevational view thereof.
Figure 35:
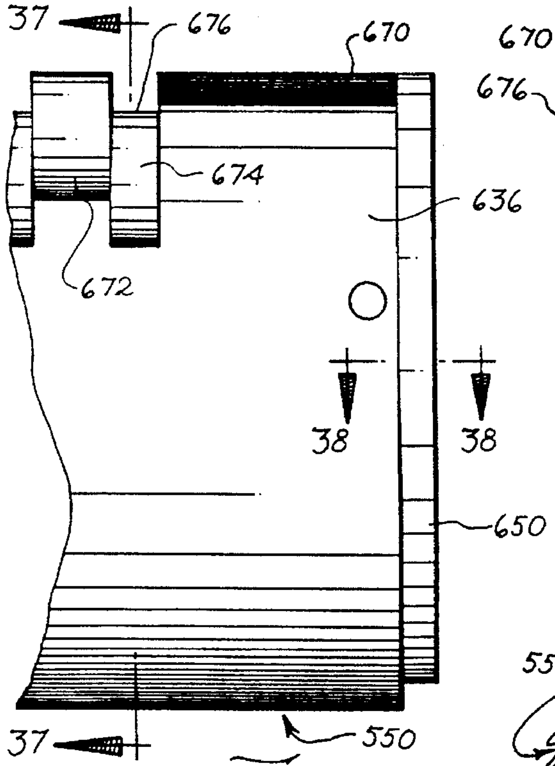
FIG. 35 is a fragmentary elevational view of the travelling backing plate.
Figure 38:
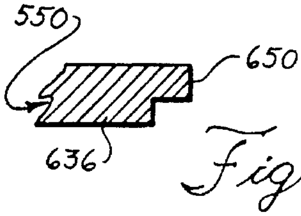
FIG. 38 is a fragmentary cross-sectional view taken along the line 38—38 of FIG. 35.

Although the rollers 540, 560 are rotating in directions which are favorable to prevent jamming of the webbing free end, it has been found desirable to provide a guide at the outer surface of roller 540, which is close-fitting and preferably gap-free engagement with the roller 540 to prevent jamming or snagging of the webbing fibers at the guide point where the roller outer surface portions engage the upper free end of the backing plate assembly 550. A gap at that point could snag a fiber or group of fibers at the leading, free end of the webbing, especially where the edge of the backing plate 636 of assembly 550 is relatively thin, as in the preferred acute angle construction as can be seen in FIGS. 36 and 37. In the preferred embodiment, these considerations are complicated by the recessed or grooved outer surface of roller 540. Accordingly, the plate 636 is provided with a toothed free edge (see FIG. 35), where the alternating elements of the edge have arcuate angle surfaces, which will be explained herein with reference to FIGS. 36 and 37, operate as stripping fingers, guiding the webbing free end away from the outer surface of roller 540.

The travelling backing plate assembly 550 also supports the fabric against the force of the extending needles, insuring reliable penetration into the webbing material. The travelling backing plate is urged by spring 630 in the direction of arrow 632, to an upstream position so as to ensure intimate engagement of the backing plate and the outer surface of roller 540.

Figure 41:
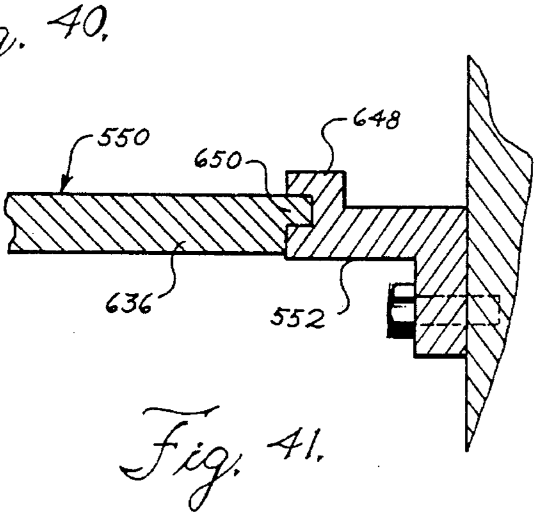
FIG. 41 is a fragmentary cross-sectional view taken along the line 41—41 of FIG. 39.

The travelling backing plate assembly 550 includes an arcuate or rounded plate 636 having laterally opposed ends received in mounting shoes 552 (see FIG. 30), so as to be mounted for pivotal movement across a portion of the circumference of take down roller 560. A post 642 is secured to plate 636 to provide connection for spring 630. The plate 636 travels back and forth along an arcuate path defined by a channeled shoulder 648 of mounting shoe 552, which receives a stepped end 650 of plate 636, as illustrated in FIG. 41.

Figure 33:
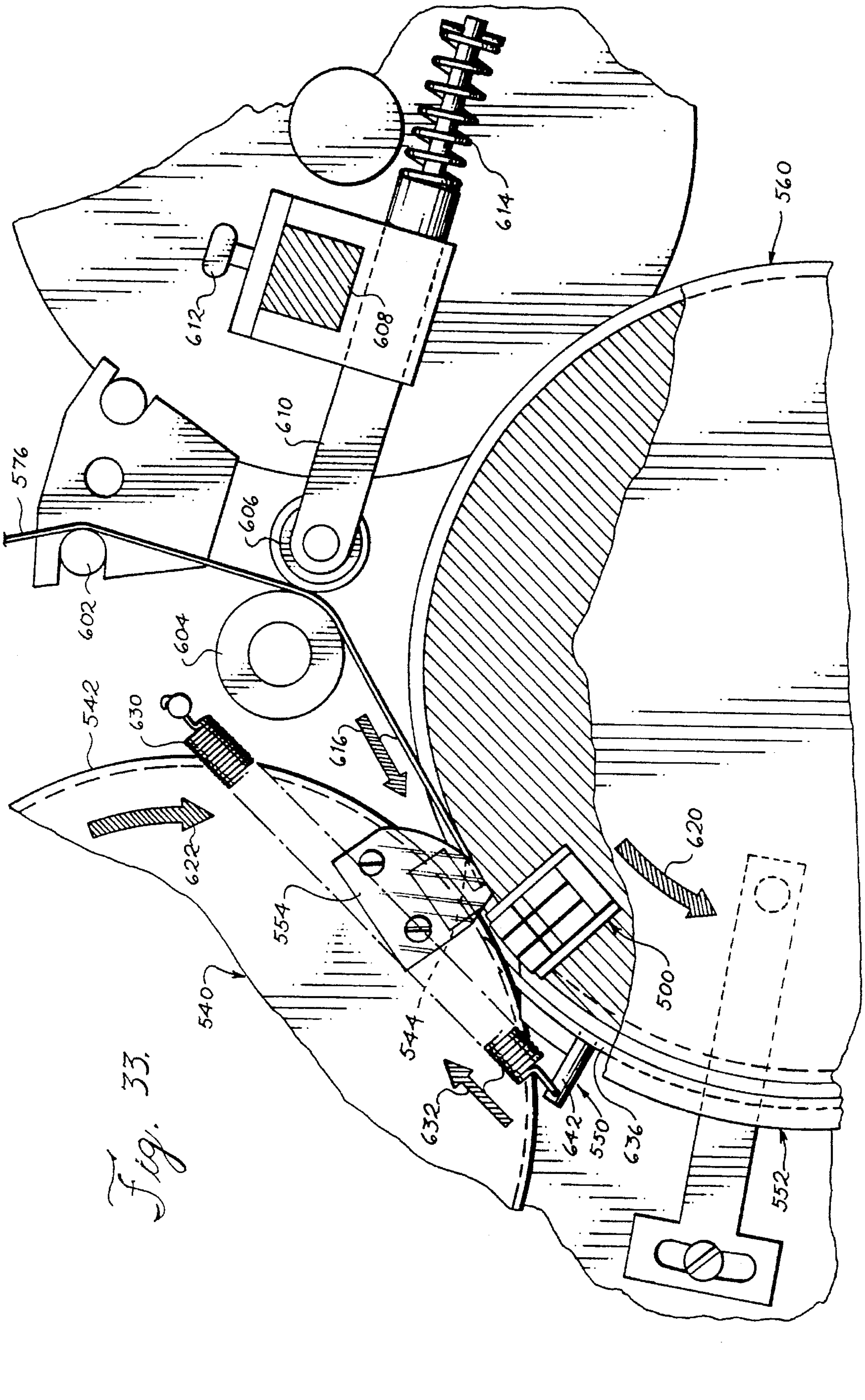
FIG. 33 is a fragmentary cross-sectional view of the apparatus of FIG. 31.
Figure 34:
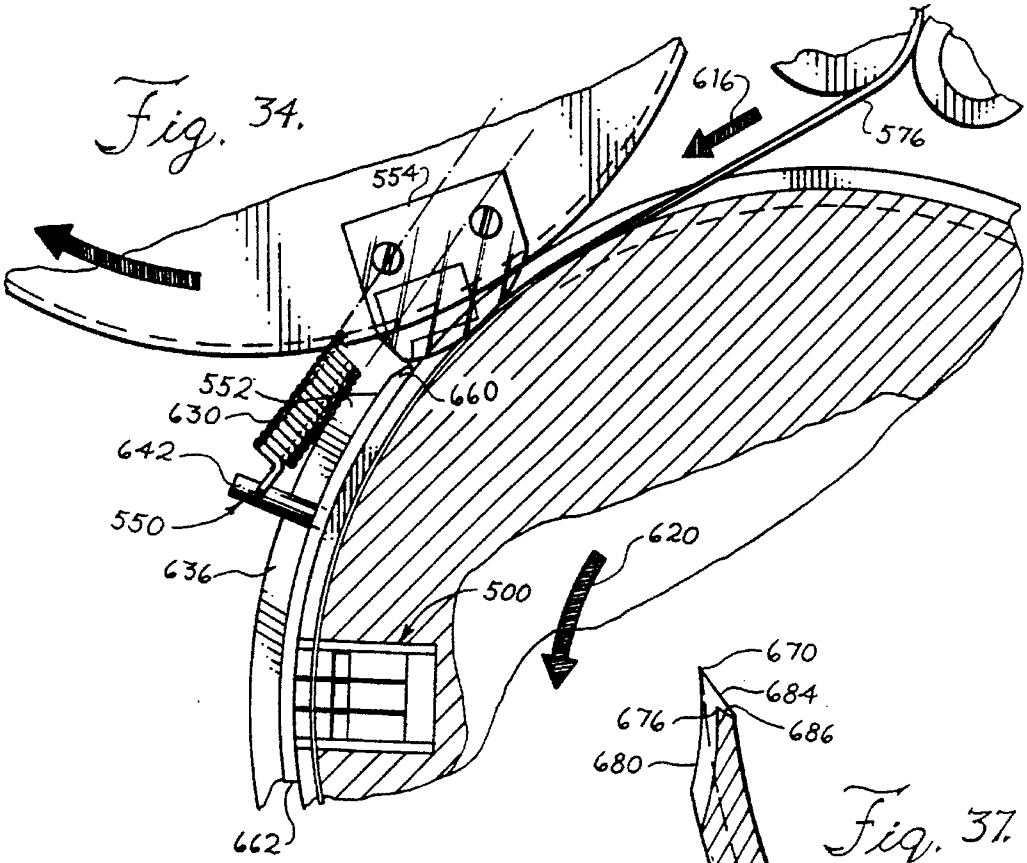
FIG. 34 is a fragmentary elevational view similar to that of FIG. 33, but taken at a later point in the operation of the apparatus.
Figure 39:
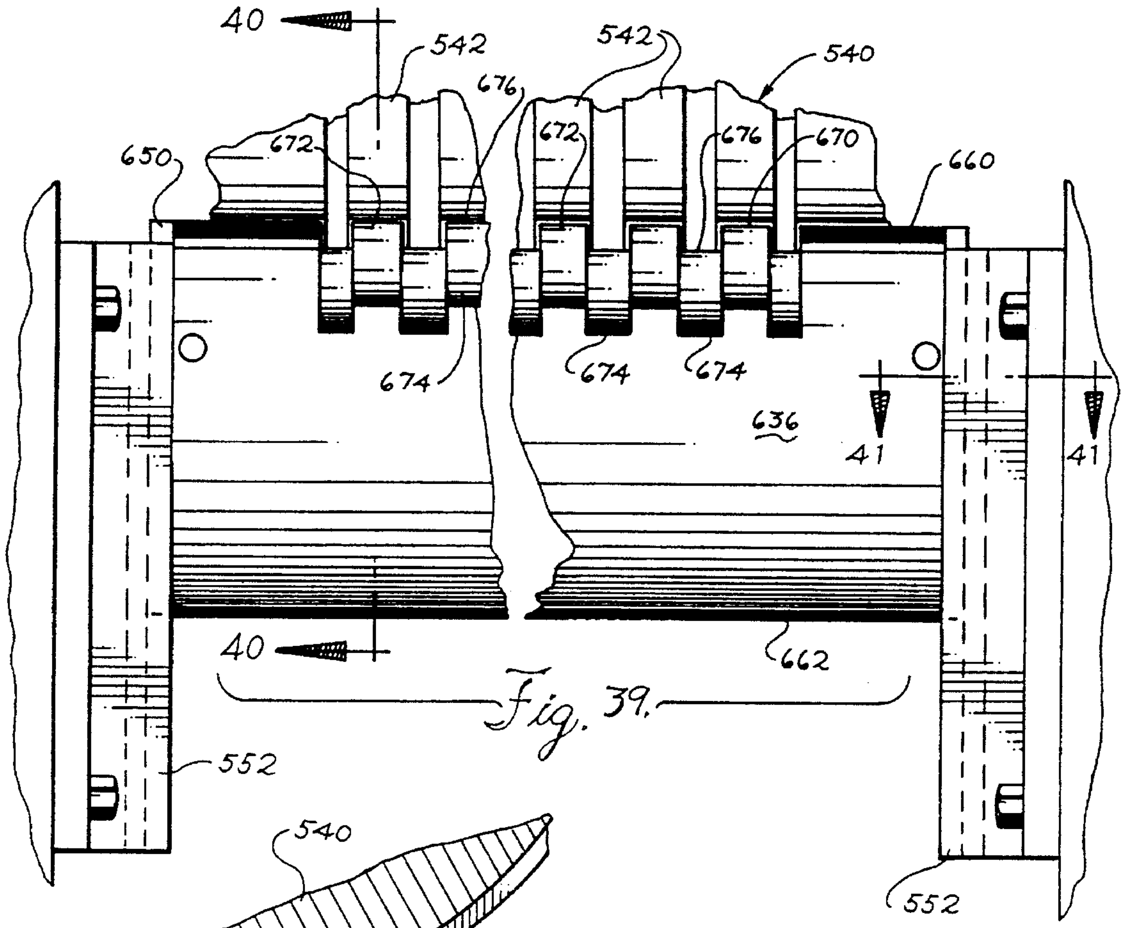
FIG. 39 is a fragmentary front elevational view showing the travelling backing plate installed in the fabrication apparatus.
Figure 40:
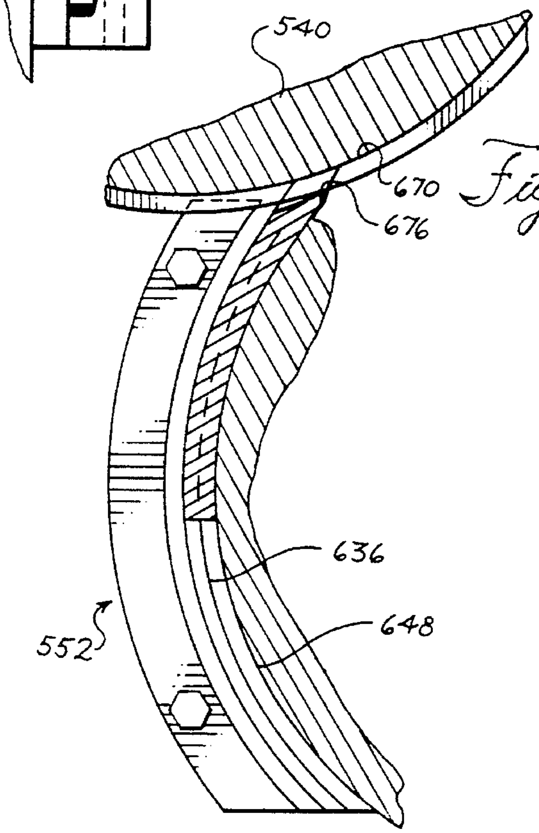
FIG. 40 is a fragmentary cross-sectional view taken along the line 40—40 of FIG. 39.

Referring additionally to FIGS. 39–40, the plate 636 includes a leading end 660 and a trailing end 662, and as can be seen in FIG. 39, has a length substantially shorter than the length of the mounting shoes 552. In FIG. 39, the plate 636 is shown in its retracted or upstream position, drawn to one end of its travel in the direction indicated by arrow 632 of FIG. 33. In this position, the teeth 672 and edges 676 are in intimate engagement with the outer surface of roller 540, as illustrated in FIG. 40. With reference to FIGS. 33 and 34, as needle bar 500 carries the leading end of webbing 576 in the direction of arrow 616, the webbing is pressed against plate 636 and, due to frictional engagement with the webbing, is dragged by the needle bar 500 in the downstream direction of arrow 620 until edge 662 of plate 636 reaches the bottom end of mounting shoe 552. Depending on swatch size and other operating conditions, the end guides 554 may push needle bar 500 out of the way of cutting blade 544. The end guides also will, on a more regular basis, push travelling plate assembly 550 away from cutting blade 544 if assembly 550 is not already moved downstream by engagement with webbing 576 (see FIG. 34). Preferably, the bottom end of channelled shoulder 648 is closed so as to interfere with edge 662 of plate 636, thus overcoming the frictional forces applied thereto by needle bar 500.

The needle bar continues to travel in the direction of arrow 620, to present webbing to the base sheet 566, in the manner described above with reference to FIG. 19, whereupon the needles of needle bar 500 are retracted, thus freeing the webbing for travel with the base sheet. As noted in FIGS. 33 and 34, the upper surface of needle bar 500 protrudes a small distance above the upper surface of take down roller 560. Thus, as the needle bar passes the plate 636, a gap is created between the plate and the outer surface of take down roller 560, to reduce the frictional engagement and hence the downstream driving force applied to plate 636. As needle bar 500 clears edge 662 of plate 636, the force of return spring 630, which has become stretched due to displacement of the plate, has sufficient force to return the plate in the direction of arrow 632, to the stripping position indicated in FIG. 33. Thus, as will now be seen, the backing plate 636 travels along with the needle bar 500 for a defined portion of a revolution, preferably between 15° and 135°.

The backing plate 636 eventually travels at generally the same speed as that of the needle bar 500 and briefly presents a relatively stationary support for the leading end of webbing 576. It is generally preferred that the backing plate 636 travels along with needle bar 500 for a short, but significant period of time, thus allowing the needles in bar 500 to "seat" in a desired manner into the matrix of webbing 576. According to one aspect of the present invention, the needles preferably travel in directions generally transverse to the direction of rotation of the take down roller on which the needle bar is mounted.

It has been found important to provide backing for the needle bar without substantial relative motion. Only after the needles have been given a sufficient time for desired seating within webbing 576, is relative sliding of the webbing across the inside face of plate 636 allowed to occur. This relative sliding begins at a point in time when further travel of backing plate 636 is obstructed and is therefore no longer free to travel with needle bar 500 in the direction of arrow 620. In the preferred embodiment, this obstruction occurs generally when trailing edge 662 contacts the closed end of channel shoulder 684 at the bottom of mounting shoes 552. If desired, the opposed lateral edges of plate 636 can be machined so as to clear the closed end of the channelled shoulder, to provide a greater amount of travel for plate 636. Protruding shoulders closely located to forward edge 660 can be provided to interfere with the closed ends of channelled shoulder 648, to provide a positive stop for further travel of plate 636.

As mentioned above, the main roller 542 has a series of annular grooves or recesses formed in the outer surface thereof. The webbing 576 is fed into a nip between rollers 540, 560 and the leading end of the webbing 576 should be directed underneath backing plate 636. Accordingly, it is important that the webbing be guided past the leading end 660 of backing plate 636. With reference to FIG. 37, the leading end 660 of plate 636 is provided with an angled tip 670. With reference to FIG. 39, the leading edge 660 of plate 636 is divided into a plurality of teeth 672 formed between recesses 674 which form a series of sharply angled free edges 676, as illustrated in FIG. 37. The teeth 672 are received in the recessed or grooved portions 542 of roller 540 and if the plate 636 is retracted when the webbing free end is pushed between rollers 540, 560 the teeth function to strip any material which may be present in the recessed portions 542 when the plate 636 is retracted to the position illustrated in FIG. 33, by action of spring 630. The pointed edges 676 also function to strip or pry the free edge of webbing 576 away from the surface of roller 540.

According to one aspect of the present invention, the edges 676 of recessed portions 674 and the edges 670 of teeth 672 are sharpened to a relatively small angle tip as illustrated in FIG. 37. The edge 680 may be relatively flat, but is preferably curved to match the outer circumference of the recessed portions 542. The edge 682 is also curved, and preferably matches the outer circumference of the main roller 540. The remaining edges 684, 686 of free end 660 are shaped to direct the free edge of webbing 576 toward the outer circumference of take down roller 560, and to enter the gap between the inside surface 637 of plate 636 and the outer surface of take down roller 560.

With reference to FIG. 39, it can be seen that the edges 670 extend forwardly of the edges 676. As shown in FIG. 37, the tip 670 is dimensioned so as to be located generally at the bottom of recesses 642. While some portions of the leading edge of webbing 576 may enter the recesses 542, the free end of the webbing is expected to contact edge 684, spaced some varying distance from the tip 670. Thus, a foolproof deflection of the leading end of webbing 576 is assured, whether or not plate 636 is seated against roller 540.

When the plate 636 is fully retracted as shown in FIG. 33 at the time the fabric is free and passes between rollers 540, 560, the leading end of webbing 576 is expected to contact those portions of edge surfaces 684, 686 located immediately adjacent the inside surface 637 of plate 636. Since the edge 684 protrudes somewhat above the edge 686, the nip between the sharpened tip 676 and the outer surface of main roller 540 is shielded by the longer edge 684 and thus, any fibers at the leading end of webbing 576 are prevented from becoming trapped. It is generally preferred that the dimensions of the recess portions 542 be designed such that, with surface 680 in contact with the bottom of the recess, the leading end of webbing 576 will not contact the sharpened tip 670, but rather will reliably contact the edge surface 684, thus further insuring a tangle-free deflection of the webbing, so as to eliminate the risk of jamming the apparatus 530.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

what is claimed is:

1. Apparatus for forming samples from a plurality of fabric webbings and for accurately positioning the samples at predetermined positions on a traveling substrate at a workstation, comprising:

means for supplying a plurality of parallel fabric webbings;

a first roller and a second roller, the second roller having an outer surface and located adjacent the first roller and the workstation;

means for rotatably mounting said first and second rollers;

means for guiding the webbing to travel over a portion of said first roller and then over a portion of said second roller;

cutting means including a knife blade fur cutting said parallel fabric webbings adjacent the first roller as the fabric webbings advance past the first roller, to separate a sample from each of said fabric webbings;

means for rotating said first and second rollers to advance the fabric samples toward the workstation:

webbing engaging means having reciprocating members with ends mounted on said first roller and movable into engagement with the parallel webbings and for holding the fabric samples cut by said knife blade, the reciprocating members of the webbing engaging means including pine, the pins being movable to extend above and to withdraw below the surface of the first roller;

first means for reciprocating said reciprocating member ends of the webbing engaging means to engage the webbing and to release the fabric samples for transfer to said second roller;

sample engaging means having second reciprocating members with ends mounted on said second roller and movable into engagement with the fabric samples at the time of transfer thereof from the first roller to the second roller, the reciprocating members of the sample engaging means comprising a plurality of retractable needles arranged in at least two series with at least two of the series of the needles extending in nonparallel directions and the needles of one series extending nonparallel to the needles of the other series, and said needles are moved to extend above and withdraw below the surface of the second roller, a conveyor for transporting a substrate to the workstation and to a position adjacent the second roller to receive the fabric samples at predetermined positions on the substrate;

drive means for driving the conveyor in timed relationship to the rotation of the second roller to position the substrate to receive the fabric samples being transferred to the substrate; and second means for reciprocating the ends of the second reciprocating members of the sample engaging means to release the fabric samples from the second roller for application to the substrate at the predetermined positions therefor on the substrate.

2. An apparatus as recited in claim 1 wherein the sample engaging means includes mounting means for mounting the needles in the at least two series, the mounting means of the sample engaging means comprises at least three longitudinal mounting bars arranged side-by-side with said needles mounted between adjacent mounting bars, the mounting bars are double ended and have longitudinal axes and move the needles toward and away from the sample when the mounting bars are moved back and forth from end to end along their longitudinal axes.

3. The apparatus of claim 1 wherein said means for rotating said first and second rollers rotates said first and second rollers in opposite directions of rotation.

4. An apparatus as recited in claims 1, 2 or 3 wherein the cutting means is on the first roller.

* * * * *

UNITED STATES PATENT AND TRADEMARK OFFICE

CERTIFICATE OF CORRECTION

PATENT NO. : 5,622,594
DATED : April 22, 1997
INVENTOR(S) : Lerner et al.

It is certified that error appears in the above-indentified patent and that said Letters Patent is hereby corrected as shown below:

IN THE CLAIMS

Claim 1, column 24, line 15, change "pine" to --pins--.

Signed and Sealed this

Twelfth Day of August, 1997

Attest:

BRUCE LEHMAN

Attesting Officer

*Commissioner of Patents and Trademarks*